United States Patent
Bojarowski et al.

(10) Patent No.: US 12,546,610 B1
(45) Date of Patent: Feb. 10, 2026

(54) LOW-BRIDGE DETECTION BY ROAD SEGMENT

(71) Applicant: Samsara Inc., San Francisco, CA (US)

(72) Inventors: Bartosz Bojarowski, Lower Silesian (PL); Hasan Saifee, San Francisco, CA (US); Dorian Wysocki, Pomeranian (PL); Justyna Zwolinska, Wroclaw (PL); Jordan Gilbertson, Seattle, WA (US); Justin Pan, San Francisco, CA (US); Xicheng Xiong, San Carlos, CA (US)

(73) Assignee: Samsara Inc., San Francisco, CA (US)

( * ) Notice: Subject to any disclaimer, the term of this patent is extended or adjusted under 35 U.S.C. 154(b) by 0 days.

(21) Appl. No.: 18/786,013

(22) Filed: Jul. 26, 2024

(51) Int. Cl.
  *G01C 21/34* (2006.01)
  *G01C 21/00* (2006.01)
  *G08G 1/01* (2006.01)

(52) U.S. Cl.
  CPC ..... *G01C 21/3415* (2013.01); *G01C 21/3881* (2020.08); *G08G 1/0116* (2013.01)

(58) Field of Classification Search
  CPC ............ G01C 21/3415; G01C 21/3881; G08G 1/0116
  See application file for complete search history.

(56) References Cited

U.S. PATENT DOCUMENTS

| | | | |
|---|---|---|---|
| 10,042,359 B1* | 8/2018 | Konrardy | B60W 40/04 |
| 10,147,323 B2* | 12/2018 | Gieseke | G08G 1/096766 |
| 12,019,448 B1* | 6/2024 | Gupta | G01C 21/3804 |
| 2004/0201495 A1* | 10/2004 | Lim | G08G 1/096783 340/905 |
| 2007/0138347 A1* | 6/2007 | Ehlers | G01C 21/3461 246/1 R |
| 2014/0303886 A1* | 10/2014 | Roemersperger | G08G 1/09675 701/411 |
| 2015/0066349 A1* | 3/2015 | Chan | G01C 21/3697 701/400 |
| 2017/0025003 A1* | 1/2017 | Arpin | G01V 8/12 |
| 2017/0072764 A1* | 3/2017 | Kleve | G01C 21/3811 |
| 2018/0335781 A1* | 11/2018 | Chase | G08G 1/0133 |
| 2021/0063186 A1* | 3/2021 | Guo | G06T 17/05 |
| 2021/0381847 A1* | 12/2021 | Cajias | G09B 29/106 |

(Continued)

*Primary Examiner* — Erin M Piateski
*Assistant Examiner* — Gabriel Joseph Rene Lambert
(74) *Attorney, Agent, or Firm* — Schwegman Lundberg & Woessner, P.A.

(57) ABSTRACT

Solutions are presented for generating alerts when a truck may collide with a bridge. The solution includes a bridge strike avoidance system that offers real-time alerts to drivers about potential low-bridge collisions. By utilizing real-time map data, vehicle height data, and detailed bridge information, bridge strike chances are reduced. The system includes tools for generating alerts by a monitoring device on the vehicle and for configuring bridge and vehicle heights. Fleet administrators can manage and review alerts, while drivers can verify or input vehicle height, including trailers. Administrators can also validate these height parameters. Map and bridge data are uploaded to the vehicle's device, which checks for low bridges within a specified distance during trips. Visual or auditory alerts notify drivers. The server logs low-bridge events, enabling a behavioral monitoring system to generate alerts and reports for fleet managers.

15 Claims, 17 Drawing Sheets

(56) References Cited

U.S. PATENT DOCUMENTS

| | | | |
|---|---|---|---|
| 2023/0050192 A1* | 2/2023 | Quirynen | G08G 1/0112 |
| 2023/0093020 A1* | 3/2023 | Li | G01C 21/3848 |
| 2023/0168106 A1* | 6/2023 | Velkavrh | G01C 21/387 |
| | | | 701/450 |
| 2023/0300375 A1* | 9/2023 | Han | G06T 9/40 |
| | | | 375/240.12 |
| 2023/0327983 A1* | 10/2023 | Song | H04L 45/123 |
| | | | 370/392 |
| 2023/0366694 A1* | 11/2023 | Kita | G01C 21/3881 |
| 2023/0366700 A1* | 11/2023 | Zhang | G01C 21/3878 |
| 2024/0116441 A1* | 4/2024 | Cooprider | B60R 1/24 |

* cited by examiner

MANAGE ASSET HEIGHT
SELECT THE ASSET(S), THEN CLICK EDIT TO MANAGE THEIR HEIGHTS.

VEHICLES 50    TRAILERS 50

| ◇ TAGS ▼ | ATTRIBUTES ▼ | VEHICLE TYPE ▼ | | 602 Q SEARCH | | | < 1 OF 4 > |
|---|---|---|---|---|---|---|---|
| ☐ NAME | LICENSE PLATE | VEHICLE TYPE | CAMERA | TAGS | HEIGHT (M) | LAST WALKAROUND HEIGHT (M) | |
| ☐ VEHICLE 11111 | IM4509 | AUTOMATIC (LIGHT TRUCK) | CM33 | LONDON | 2.5 | 3.4 △ 604 2 DAYS AGO | EDIT |
| ☐ VEHICLE 2222 | IM4509 | AUTOMATIC (LIGHT TRUCK) | CM33 | LONDON | 3.0 | 3.0 2 DAYS AGO | EDIT |
| ☐ VEHICLE 33333 | IM4509 | AUTOMATIC (LIGHT TRUCK) | CM33 | LONDON | 2.8 | 2.8 1 DAY AGO | EDIT |
| ☐ VEHICLE 4444 | IM4509 | AUTOMATIC (LIGHT TRUCK) | CM33 | LONDON | 3.2 | 3.0 △ 1 DAY AGO | EDIT |
| ☐ VEHICLE 5555 | IM4509 | AUTOMATIC (LIGHT TRUCK) | CM33 | LONDON | - △ | 1.2 1 DAY AGO | EDIT |

BRIDGE DATA TABLE

TILE CONTAINS DATA ON SEGMENTS WITH BRIDGES, INCLUDING DISTANCE IN SEGMENTS TO BRIDGES

EXAMPLE

| SEG_ID | BR_SG_ID | BR_NODE_ID | PARENT_ND_ID | SGS AWAY | DISTANCE PARENT NODE TO BRIDGE NODE |
|---|---|---|---|---|---|
| 26262831 | 638725598 | 6019366640 | 6019366639 | 2 | 12.2 |
| 26308486 | 320701173 | 3273365400 | 4016169854 | 2 | 12.2 |
| 26338639 | 1117842657 | 10223826913 | 288558248 | 2 | 12.2 |
| 26430407 | 686598729 | 289583958 | 289583942 | 2 | 12.2 |
| 27086174 | 187203101 | 1979469593 | 268095018 | 2 | 12.2 |
| 27093179 | 918737221 | 8532547398 | 8532547399 | 2 | 12.2 |
| 27279230 | 148312433 | 5755489760 | 27492412 | 2 | 12.2 |
| 27340581 | 257909917 | 2633549165 | 2633549167 | 2 | 12.2 |
| 27547176 | 1159019968 | 302403645 | 265292177 | 2 | 12.2 |

LOW-BRIDGE DETECTION BY ROAD SEGMENT

TECHNICAL FIELD

The subject matter disclosed herein generally relates to methods, systems, and machine-readable storage media for vehicle safety technologies, including methods, systems, and machine-readable storage media for vehicle security.

BACKGROUND

Around 2000 bridge strikes happen in the UK every year. These bridge strikes have enormous consequences for fleets year on year, with the average collision costing around £700K. In addition to paying for inspections and repairs to road infrastructure, vehicles, and other road users, companies are liable to pay for any disruption the strike has caused. This issue is highly relevant in the US as well, where approximately 150 vehicle bridge hits occur each year in New York alone, costing the state roughly $30 million. Even if the damage is minimal, fleets could be fined significant amounts if other parties have been greatly inconvenienced.

A common factor contributing to these incidents is the drivers' lack of awareness of their vehicle's height relative to bridge clearances along their route. Other factors include poorly marked bridges, aging infrastructure, and a lack of coordination between Network Rail and the highway system.

In some existing solutions that rely on geofences, drivers end up receiving an excessive number of alerts, leading to potential alert fatigue and the risk of ignoring critical alerts.

What is needed are solutions that prevent collisions with bridges and reduce the number of false alerts for drivers. At the same time, ensure timely alerts for drivers to react appropriately when approaching bridges.

BRIEF DESCRIPTION OF THE DRAWINGS

Various appended drawings illustrate examples of the present disclosure and cannot be considered limiting its scope.

FIG. 6 is a user interface (UI) for configuring vehicle height, according to some examples.

DETAILED DESCRIPTION

Figure 1:
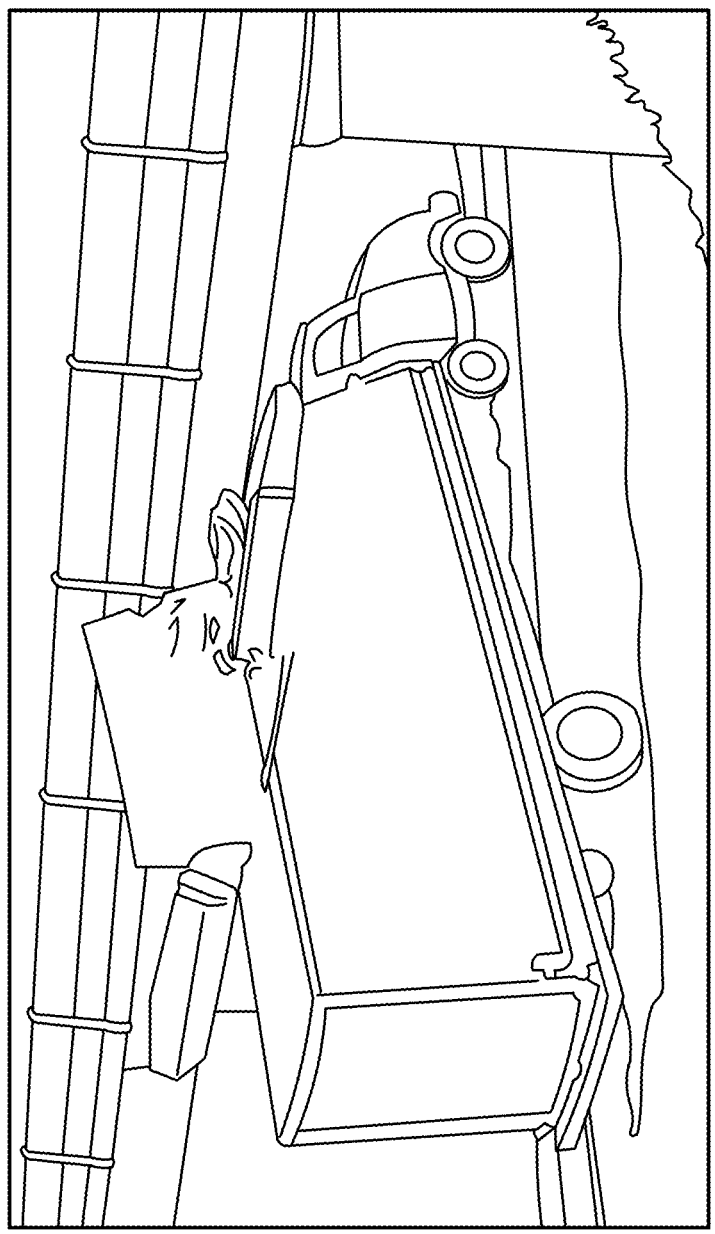
FIG. 1 shows a truck hitting a bridge with low clearance.

Example methods, systems, and computer programs are directed at generating alerts when a truck may collide with a low-clearance bridge. Examples merely typify possible variations. Unless explicitly stated otherwise, components and functions are optional and may be combined or subdivided, and operations may vary in sequence or be combined or subdivided. The following description provides numerous specific details to provide a thorough understanding of examples. However, it will be evident to one skilled in the art that the present subject matter may be practiced without these specific details.

Solutions are presented for a bridge strike avoidance feature that provides real-time alerts to drivers about potential low-bridge collisions. By leveraging real-time map-matching information at a monitoring device in the vehicle, combined with vehicle height data and detailed bridge information, the solution seeks to minimize the risk of bridge strikes.

In one aspect, data related to bridges is gathered, including bridge locations, heights, and other relevant attributes. This data can be collected from various sources such as government databases, satellite imagery, and manual surveys. Further, tools for managing low-bridge alerts are provided, both at the server level and within a driver application. These tools may include software applications, user interfaces, and APIs that allow for the configuration and dissemination of alerts. The purpose of this operation is to ensure that both the server and the driver have the necessary tools to handle low-bridge alerts effectively.

In some examples, the tools include a tool for the fleet administrator to manage and review alerts and a driver app for reviewing and configuring the height of the truck and the trailer. The driver app enables the driver to verify or input the vehicle height, including a trailer if attached. Further, the UI for fleet administrators allows the fleet administrators to validate the height parameters configured by the drivers.

Subsequently, the gathered map and bridge data is uploaded to the vehicle's monitoring device (e.g., the cam device 404 or the comm device 402 of FIG. 4).

During a trip, checks are performed for the proximity to low bridges within a predetermined threshold distance. In-cab alerts are generated when a low bridge is detected near the vehicle. These alerts can be visual, auditory, or both and are designed to capture the driver's attention immediately.

The server is also notified of low-bridge events. The monitoring device in the vehicle notifies the server (e.g., behavioral monitoring system 206 of FIG. 2) of any low-bridge events detected during the trip. This notification can include details such as the location of the bridge, the time of detection, and the vehicle's response. Based on the notifications received from the vehicle, the behavioral monitoring system 206 may generate alerts for the fleet managers.

Further, the server generates periodic reports for low-bridge events. These reports can include statistical analyses, trends, and recommendations for improving safety. The purpose of this operation is to provide insights and data-driven recommendations for enhancing road safety and preventing future collisions.

Glossary of Terms

Some of the concepts used for the description of the solution are presented below.

A node is a point in space defined by latitude, longitude, and node identifier (ID). In some cases, the node may also include the altitude. Nodes can represent specific, individual point features such as a tree, a postbox, a bus stop, or a street lamp. Further, nodes may be used to define the shape of linear features (e.g., a segment), such as roads, rivers, and boundaries, and nodes can be members of relations, which define complex structures or relationships between multiple elements, such as routes or areas.

A segment represents a linear feature on the ground, such as a road, wall, or river, or any portion thereof. A segment is a series of nodes connected in a specific order. In some examples, the segment is an ordered list of nodes that is usually associated with at least one tag or is part of a relation. In everyday terms, a segment is a line on the map that can have different properties depending on the tags that are added to it.

Segments can have tags attached to them, similar to nodes, which provide additional information about the feature being represented. For example, a segment with the tag "highway=residential" would indicate that the segment is a residential road.

In OpenStreetMap (OSM), a segment is referred to as a "way." Although some aspects of the solution are described with reference to OSM, the same principles may be used with other types of maps, such as Google Maps®. In OSM, a way is a collection of ordered nodes that form a polyline, which can represent various geographic features. There are two primary types of segments: open segments and closed segments.

An open segment is a segment where the first and last nodes are not the same. Open segments can represent roads, rivers, railways, paths, and other linear structures.

A closed segment is a segment where the first and last nodes are the same, forming a closed loop. Closed segments can represent areas or polygons such as parks, lakes, buildings, land use areas, and other enclosed features.

FIG. 1 shows a truck hitting a bridge with low clearance. When the truck hits the bridge, the damages go beyond just the damage to the truck but also to the potential loss of cargo, damage to the bridge, damage to bystanders, etc. This is why accidents involving bridges are very costly for the company that owns the truck.

Some solutions available in the market rely on a circular geofence approach, but this approach generates many false positives because the geofence may include bridges that are not even in the path of the vehicle or fail to consider the direction of travel. Further, using detailed geofences beyond the use of circles tends to cause performance issues as the monitoring device has to perform many more computations to determine if the vehicle is within the geofence.

Further, circular geofences, centered on a specific latitude and longitude, present a set of challenges driven by product requirements. For example, these geofences would need to be significantly large to provide timely alerts, which increases the risk of triggering alerts for bridges on adjacent, irrelevant side roads. Also, using geofences diminishes the ability to discern whether a vehicle is passing over or under a bridge in perpendicular encounters, necessitating more complex heuristics. All of these could inflate the false alert rate, potentially leading drivers to disregard these warnings over time.

Further, using road-aligned geofences introduces another layer of complexity. Crafting precisely drawn geofences requires an understanding of the roads' geometries.

Solutions are presented that improve the detection of possible collisions with bridges without generating an unnecessary amount of false alerts. The presented solutions provide several features. For the fleet administrator, the route of a truck may be presented with an indication of whether the truck will be passing under a bridge or tunnel that is lower than the vehicle's cab or trailer. If there is a risk of a collision, a new route will be presented as an alternative.

Further, options are provided to the fleet administrator and the driver to configure the maximum heights of the cab and trailer so these values can be used to detect bridge collisions.

Further, alerts may be generated for the driver and the fleet administrator. The driver will be able to correct the course before reaching the bridge, and the administrator may be able to notify the driver and make sure that the driver is aware of the hazardous situation.

The presented solutions include detection by a monitoring device on the vehicle instead of relying on backend-based methods that may include latency or create problems when connectivity is lost with the driver or the monitoring device.

In some examples, the bridge data is integrated with map-tile functionality, which facilitates quicker lookups for nearby features, including bridge heights. This architectural approach not only minimizes latency but also significantly reduces the risk of false alarms, enabling the system to trigger alerts with more accuracy and closer proximity to potential hazards.

These solutions provide value to the customer because the techniques minimize the chance of trucks with overly tall trailers impacting the underside of bridges. Further, the solution provides value to a service provider that monitors vehicles for safety events because the provided solution will generate immediate returns to clients and may provide opportunities to acquire new clients based on the improved functionality.

Figure 2:
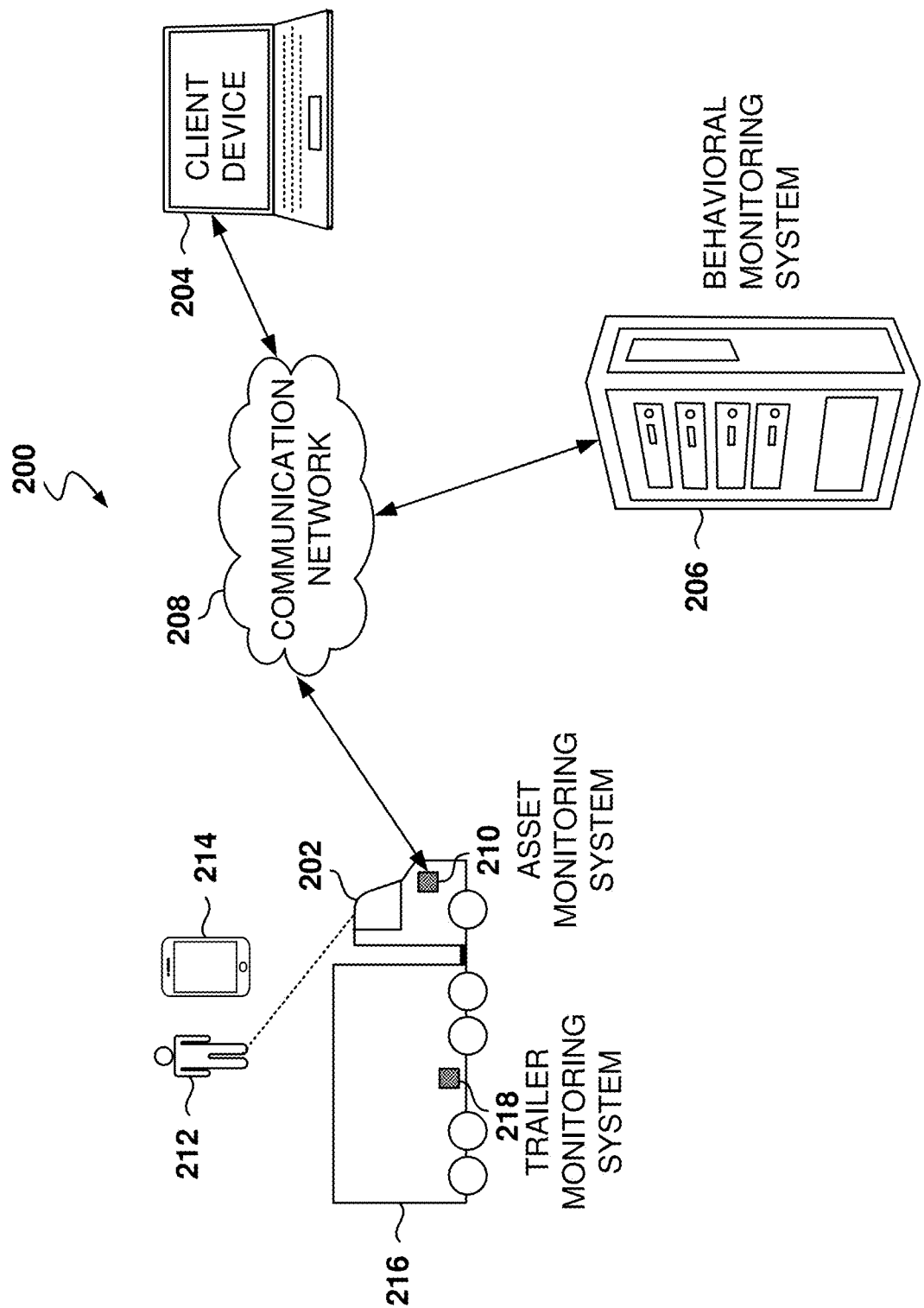
FIG. 2 shows a system for vehicle rider behavioral monitoring, according to some examples.

FIG. 2 shows a system 200 for vehicle rider behavioral monitoring, according to some examples. As shown, multiple devices (e.g., vehicle 202, trailer 216, client device 204, and behavioral monitoring system 206) are connected to a communication network 208 and configured to communicate with each other through the communication network 208. The communication network 208 is any type of network, including a local area network (LAN), such as an intranet, a wide area network (WAN), such as the internet, a mobile telephone network, a satellite communications network, or any combination thereof. The communication network 208 is implemented using any number of communication links associated with one or more service providers, including one or more wired communication links, one or more wireless communication links, or any combination thereof.

The vehicle 202 may be any type of vehicle or combination vehicle, such as an automobile, semi-trailer truck, trailer, plane, train, ship, and the like. Further, the techniques presented herein may be used with other non-moving assets that are operated by an operator (e.g., cranes, manufacturing equipment, call centers) and assets that are controlled remotely (e.g., drones, air traffic controllers). The examples described herein should therefore not be interpreted to be exclusive or limiting, but rather illustrative.

As shown, the vehicle 202 includes an asset monitoring system (AMS) 210 that allows for monitoring events at the vehicle and exchanging information and commands between the vehicle 202 and one or more remote computing devices via the communication network 208. In some examples, the AMS includes a communications device (also referred to as a vehicle gateway) and a camera device. The trailer 216 includes a TMS 218 that allows for monitoring events at the trailer and exchanging information and commands between the trailer 216 and other computing devices (e.g., the behavioral monitoring system 206, the AMS 210) via the communication network 208. In some examples, the TMS 218 includes an asset gateway, which is a device installed in the trailer for capturing data and sending the data to the BMS.

The asset monitoring system 210 may include one or more hardware devices to perform monitoring functions at the vehicle, such as a communications device and a camera device, but other configurations are also possible.

The asset monitoring system 210 allows the vehicle 202 to transmit data, such as sensor data gathered by sensors in the vehicle 202, to a remote computing device. The vehicle 202 may be equipped with a variety of sensors that capture data describing the performance of the vehicle 202, actions performed by riders in and around the vehicle 202, and the vehicle's surrounding environment.

The behavioral monitoring system 206 is a computing system consisting of one or more computing devices configured to provide remote behavioral monitoring of a vehicle 202 to detect different conditions of driver state and execute corresponding responses. For example, the behavioral monitoring system 206 may allow a user, such as a fleet manager administrator, to define a set of triggering conditions and criteria for detecting and responding to undesirable behavior or dangerous conditions.

To utilize the functionality of the behavioral monitoring system 206, users (e.g., administrators and fleet managers) may use the client device 204. Although the shown system 200 includes only one client device 204 and one vehicle 202, this is only for ease of explanation and is not meant to be limiting. One skilled in the art would appreciate that the system 200 could include any number of client devices 204 and vehicles 202. Further, the behavioral monitoring system 206 may concurrently accept communications from and initiate communication messages, and interact with, any number of client devices 204 and vehicles 202, and support connections from a variety of different types of client devices 204.

A user may interact with the behavioral monitoring system 206 via a client-side application installed on the client device 204. In some examples, the client-side application includes a component specific to the behavioral monitoring system 206. For example, the component may be a stand-alone application, one or more application plug-ins, or a browser extension. However, the users may also interact with the behavioral monitoring system 206 via a third-party application, such as a web browser or messaging application, that resides on the client device 204 and is configured to communicate with the behavioral monitoring system 206. In either case, the client-side application presents a user interface (UI) for the user to interact with the behavioral monitoring system 206.

The behavioral monitoring system 206 may provide a user interface that allows administrators to configure the triggering conditions. Each triggering condition defines one or more individual conditions that, if satisfied, indicate the occurrence of an undesirable behavior or a critical event such as a collision. For example, a triggering condition may be satisfied when a truck approaches a bridge with lower clearance than the height of the truck or the trailer. As another example, a triggering condition may define unsafe lane-departure events.

The user interface also enables the administrators to define corresponding actions to be performed in the event that a triggering condition has been satisfied/triggered. For example, the user interface enables the administrator to define contact identifiers (e.g., email addresses, phone numbers, etc.) to which notifications are to be sent. Similarly, the user interface enables the administrator to define actions for generating an incident report based on the detected occurrence of undesirable behavior.

Further, a driver 212 may interact with the behavioral monitoring system 206 and the AMS 210 via a mobile device 214. A BMS application (app) may execute on the mobile device 214 and connect (e.g., via wireless communication such as cellular, WiFi, or Bluetooth) to the AMS 210 and the behavioral monitoring system 206 to perform operations related to the BMS, such as getting information for a trip, receiving feedback regarding in-vehicle behavior, attend training, etc. Alternatively, the driver 212 may access the same functionality via a web browser executing on the mobile device 214.

Figure 3:
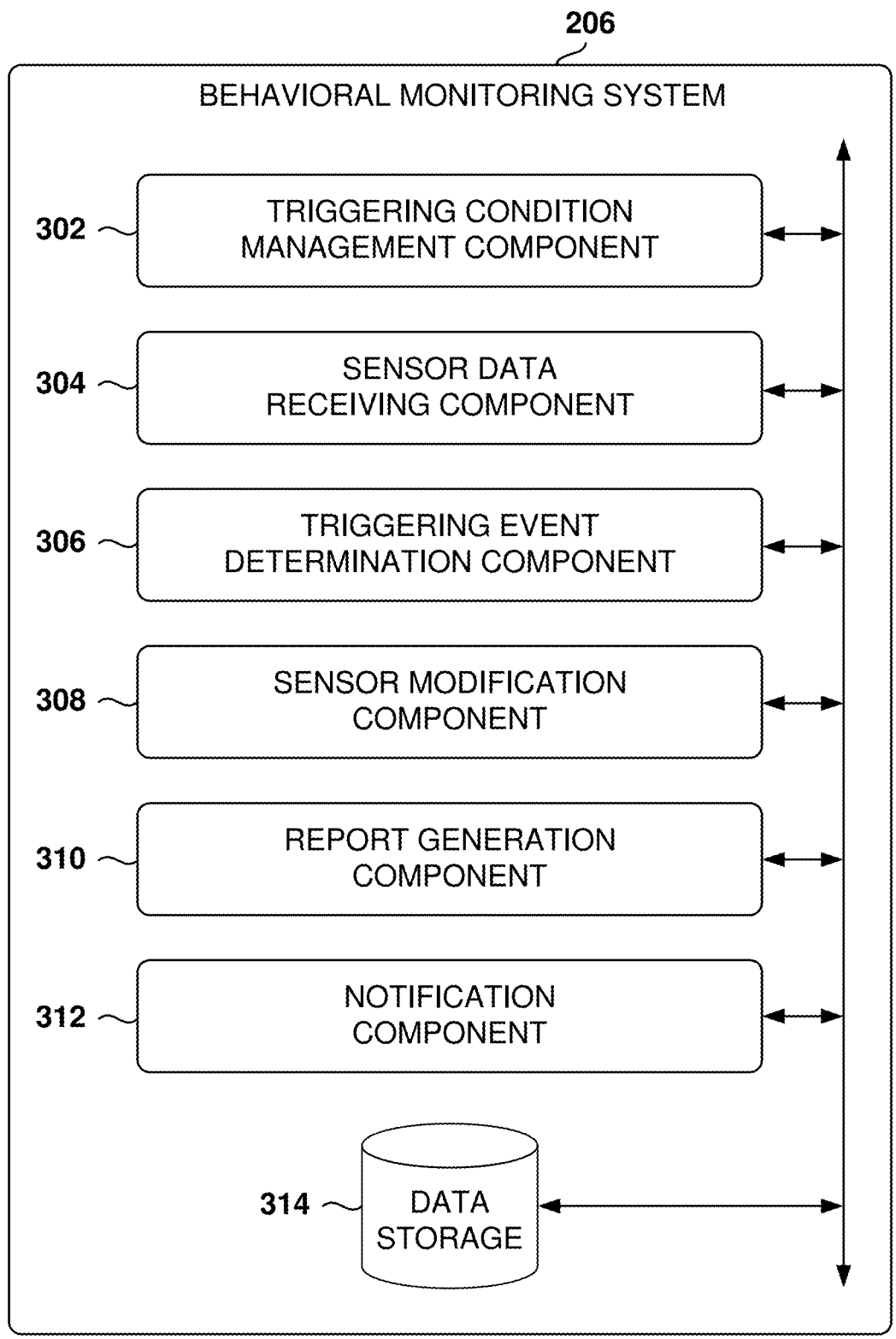
FIG. 3 is a block diagram of a Behavioral Monitoring System (BMS), according to some examples.

FIG. 3 is a block diagram of a behavioral monitoring system 206 (BMS), according to some examples. To avoid obscuring the inventive subject matter with unnecessary detail, various functional components (e.g., modules) that are not germane to conveying an understanding of the inventive subject matter have been omitted from FIG. 3. The various functional components depicted in FIG. 3 may reside on a single computing device or may be distributed across several computing devices in various arrangements, such as those used in cloud-based architectures.

The behavioral monitoring system 206 includes a triggering condition management component 302, a sensor data receiving component 304, a triggering event determination component 306, a sensor modification component 308, a report-generation component 310, a notification component 312, and a data storage 314.

The triggering condition management component 302 facilitates the generation and modification of triggering conditions. For example, triggering condition management component 302 provides a graphical user interface that allows administrators to generate and modify triggering conditions. Each triggering condition defines one or more individual conditions that, if satisfied, indicate the occurrence of an undesirable behavior, as well as a corresponding set of response actions to be performed if the triggering condition has been satisfied. The user interface provided by the triggering condition management component 302 enables administrators to define the triggering conditions. Triggering conditions may include any one or combination of specific criteria or parameters that, when met or surpassed, prompts a predetermined or user-defined response within the system. For example, such conditions can include: thresholds; the detection of image features from camera feeds; anomalies in sensor data, such as irregular steering or braking patterns; behavioral patterns, including, for example, a lack of interaction with vehicle controls or infrequent checks of mirrors; as well as the presence of certain environmental factors like the time of day, adverse weather conditions, or high traffic density.

Similarly, an administrator may use the user interface elements to define corresponding actions to be performed in the event that a triggering condition has been triggered. In some examples, the triggering condition management component 302 stores the generated triggering conditions in the data storage 314. The stored triggering conditions may be associated with an account and fleet identifier that identifies the account, vehicle fleet, or vehicles to which the triggering conditions are associated.

The sensor data receiving component 304 receives sensor data from the vehicles 202, including data from the sensors in the AMS 210. The sensor data receiving component 304 provides the sensor data to the other components of the behavioral monitoring system 206 for use in detecting the occurrence of undesirable behavior. The sensor data receiving component 304 may also store the sensor data in the data storage 314, where it may be accessed by the other components of the behavioral monitoring system 206. For example, the stored sensor data may be associated with a unique identifier associated with the vehicle 202 from which the sensor data was received. The sensor data may also include timestamp data indicating the time at which the sensor data was captured by the sensors of the vehicle 202 or when the sensor data was received by the behavioral monitoring system 206.

The triggering event determination component 306 uses the sensor data received by the sensor data receiving component 304 to determine whether any of the triggering conditions have been satisfied. In some examples, a triggering condition may be based on a combination of individual conditions, such as a combination of detecting specified terms, detecting specified motions, or detecting a specified volume level. In these types of examples, the triggering event determination component 306 may use the sensor data to determine that each of the individual conditions has been satisfied within a predetermined time window, such as within a five-second window. For example, the triggering event determination component 306 may use timestamp data associated with the sensor data to determine whether each of the individual conditions was satisfied within the predetermined time window. Accordingly, the triggering condition is satisfied when each of the individual conditions occurs within the predetermined time window.

The triggering event determination component 306 notifies the other components of the behavioral monitoring system 206 if a triggering condition has been triggered.

The sensor modification component 308 modifies the operating mode of sensors in the vehicle 202. In some cases, an administrator or fleet manager may wish to capture additional or higher-quality sensor data to document a detected incident of undesirable behavior. For example, the administrator or fleet manager may wish to initiate the use of sensors, such as cameras, microphones, or other sensor devices, to capture sensor data and document the incident.

The report-generation component 310 generates an incident report to document a detected occurrence of undesirable behavior. The incident report may include any of a variety of data defined by an administrator in a triggering condition. For example, an incident report may include data identifying the vehicle 202, the driver of the vehicle, the time of the incident, the action that satisfied the triggering condition (e.g., lane departure, tampering, driving while drowsy, etc.), as well as captured sensor data depicting the incident. The report-generation component 310 may store the incident report in the data storage 314, where an administrator or other authorized user may access it.

The notification component 312 generates and transmits a notification to users defined by the triggering condition. For example, the notification component 312 identifies a contact identifier corresponding to the triggering event. An administrator may define the contact identifier when generating the triggering event. The contact identifier provides contact details for reaching a user designated to receive a notification when the triggering event is triggered. For example, the contact identifier may be an email address, phone number, and the like.

The notification component 312 may then transmit a notification directed to the content identifier. The notification may provide details of the detected incident, such as a description of the undesirable behavior, time, associated vehicle 202, and the like. The notification may also enable a user to access an incident report associated with the detected incident.

Figure 4:
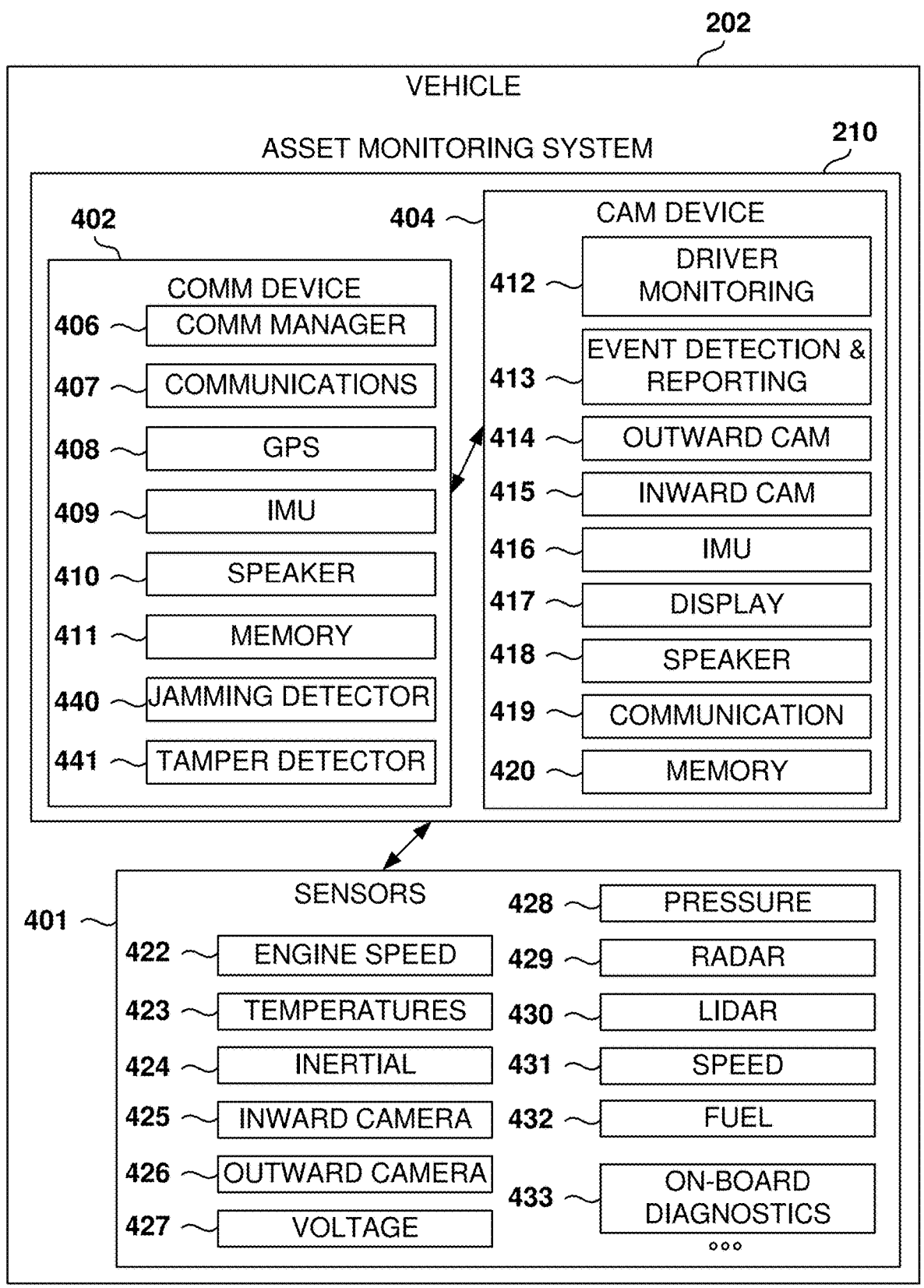
FIG. 4 illustrates the components of a vehicle for rider behavioral monitoring, according to some examples.

FIG. 4 illustrates components of a vehicle 202 for rider behavioral monitoring, according to some examples. The vehicle 202 includes the asset monitoring system 210 and a plurality of sensors 401. The AMS 210 may include a single device or distribute its functions across a plurality of devices in the vehicle (e.g., sensors, processors, communications devices) that are able to communicate among themselves. In the illustrated example, the AMS 210 includes a communication (comm) device 402 and a camera (cam) device 404, but other examples may utilize different numbers of devices or distribute their functionality differently.

The comm device 402 provides communication services within the vehicle and the network and may connect to the diagnostic port in the vehicle to gather vehicle information. In some examples, the comm device 402 includes a communications manager 406, a communications module 407, a Global Positioning System (GPS) 408, an Inertial Measurement Unit (IMU) 409, a speaker 410, computer memory 411 (RAM and permanent storage), a jamming detector 440, a tamper detector 441, and one or more processors (not shown). The GPS 408 and the IMU 409 may be used, together or separately, to calculate the speed of the vehicle.

The communications manager 406 coordinates communications with the BMS and other devices in the vehicle, such as the cam device 404. The communications module 407 provides one or more communication interfaces, such as mobile telephony, satellite communications, WiFi, Bluetooth, etc. Further, the communications manager 406 may provide a WiFi hotspot to other devices in the vehicle so these devices can communicate to the network via the WiFi hotspot.

The IMU 409 sensor detects the motion and orientation of the vehicle, and the memory 411 stores data collected during the operation of the vehicle and programs that may be executed on the comm device 402.

The jamming detector 440 detects when the electronic signals (e.g., Global Positioning System (GPS)) to the vehicle are being jammed, such as by utilizing a GPS jammer. The GPS jammer is a device that disrupts or interferes with the signals from GPS satellites by emitting radio frequency signals that can overwhelm the GPS signals, making it difficult or impossible for GPS receivers to determine their location accurately. The GPS jammers may use interference to broadcast signals at the same frequency as GPS satellites, which can overpower the weak signals from space. This interference can cause the GPS receiver to lose its lock on the satellite signals, rendering it unable to calculate its position. The GPS jammers may also use jamming signals that are stronger than the GPS signals, which are already very weak when they reach the Earth's surface. The tamper detector 441 is for detecting tampering, such as when the dashboard cover is being removed.

In some examples, the cam device 404 includes a driver monitoring module 412, an event detection and reporting system 413, an outward camera 414 that captures images in the direction of travel, an inward camera 415 that captures images of the vehicle cabin, an IMU 416, a display 417 (e.g., a touchscreen, computer display, LED lights), a speaker 418, a communications module 419, a memory 420, and a processor (not shown). The inward camera 415 is installed within the vehicle cabin to monitor the driver and passengers, while the outward camera 414 provides visual information about the environment surrounding the vehicle.

The driver monitoring module 412 performs one or more activities regarding driver behavior, such as LD detection, driving while drowsy, following too close, sudden braking, etc. The event detection and reporting system 413 is configured to identify and log significant events based on sensor data. For example, the event detection and reporting system 413 may detect when the truck is approaching a bridge, and there is a risk of collision. The display 417 provides visual feedback and information to the vehicle occupants, while the speaker 418 provides auditory information or alerts. Further, the memory 420 stores data collected during the operation of the vehicle and programs that may be executed on the cam device 404.

In some examples, the cam device 404 is configured to execute the machine learning models, but other examples may execute the machine learning models in the comm device 402. Other configurations may include additional devices within the AMS 210 or consolidate all functions within a single device.

In some examples, the comm device 402 and the cam device 404 are connected via a hardwire connection (e.g., USB), and the cam device 404 may be powered via this hardwire connection. In some examples, the comm device 402 draws power from the vehicle's electrical system. Further, the AMS may include other sensors, such as any of the sensors 401. The AMS 210 is configured to communicate with any of the sensors 401 in the vehicle.

The sensors 401 are configured to monitor various parameters and states of the vehicle. In some examples, the sensors 401 include an engine speed sensor 422 that measures the revolutions per minute of the engine, temperature sensors 423 that measure various temperature points in the vehicle (e.g., cabin, engine, outside), and inertial sensors 424 that detect motion and orientation of the vehicle. The sensors 401 may also include an inward camera 425, an outward camera 426, a voltage sensor 427 that monitors the electrical system of the vehicle, and pressure sensors 428, which detect the pressure in various systems such as tires or hydraulic systems. Further, the sensors 401 may include radar sensors 429 and Light Detection and Ranging (LIDAR) sensors 430, which provide distance and mapping capabilities for the vehicle's surroundings. A speed sensor 431 measures the traveling speed of the vehicle, and fuel sensors 432 monitor the amount of fuel in the tank. The vehicle may also include an on-board diagnostics system 433 for self-diagnosis and reporting of the operational status of the vehicle 202.

Figure 5:
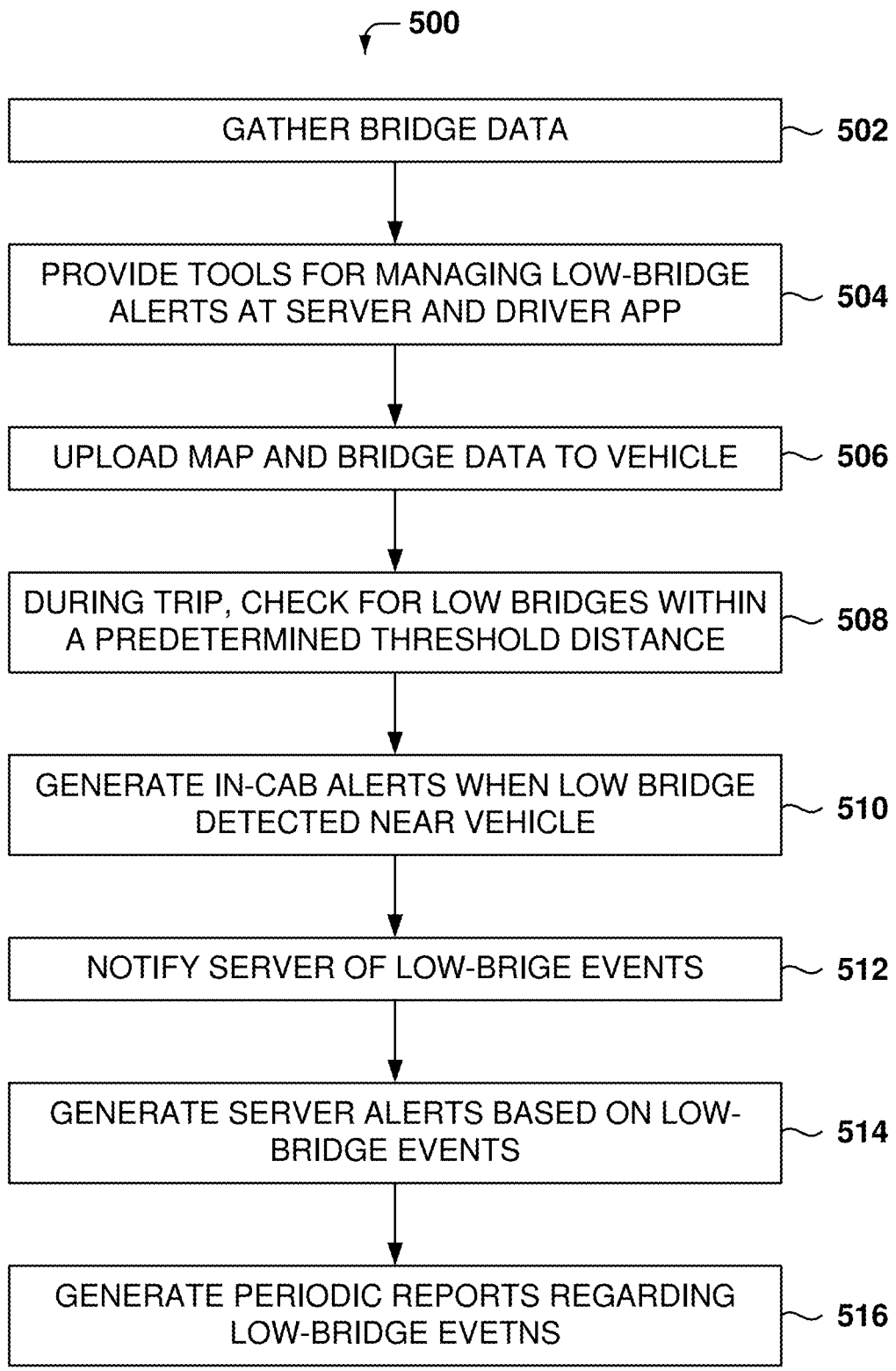
FIG. 5 is a flowchart of a method for generating alerts when a truck may collide with a bridge, according to some examples.

FIG. 5 is a flowchart of a method 500 for generating alerts when a truck may collide with a bridge, according to some examples. While the various operations in this flowchart are presented and described sequentially, one of ordinary skill will appreciate that some or all of the operations may be executed in a different order, be combined or omitted, or be executed in parallel.

Operation 502 is for gathering data related to bridges, including their locations, heights, and other relevant attributes. This data can be collected from various sources such as government databases, satellite imagery, and manual surveys. The purpose of this operation is to create a comprehensive database of bridge information that can be used to identify potential collision risks for trucks.

From operation 502, the method 500 flows to operation 504 to provide tools for managing low-bridge alerts both at the server level and within a driver application. These tools may include software applications, user interfaces, and APIs that allow for the configuration and dissemination of alerts. The purpose of this operation is to ensure that both the server and the driver have the necessary tools to handle low-bridge alerts effectively.

In some examples, the tools include a tool for the fleet administrator to manage and review alerts and a driver app for reviewing and configuring height for the truck and the trailer. The driver app enables the driver to verify or input the vehicle height, including a trailer if attached. Further, the UI for fleet administrators allows the fleet administrators to validate the height parameters configured by the drivers.

From operation 504, the method 500 flows to operation 506 for uploading the gathered map and bridge data to the vehicle's monitoring device (e.g., the cam device 404 or the comm device 402). This may involve transferring data via wireless communication methods such as cellular networks or satellite communications. The purpose of this operation is to ensure that the vehicle has access to the most up-to-date bridge information during its trip.

From operation 506, the method 500 flows to operation 508 for checking for low bridges within a predetermined threshold distance. In some examples, the threshold distance is hundred and 150 m, which is configurable by the fleet administrator, but other examples may use other thresholds, such as in the range from 25 m to a kilometer or more.

In other examples, the threshold may be instead based on time, such as how long the truck will take to reach the bridge at the current speed. During the trip, the cam device 404 continuously checks for low bridges within a predetermined threshold distance from the vehicle's current location. This involves real-time processing of the vehicle's GPS data and comparing it with the bridge data. The purpose of this operation is to proactively identify potential collision risks before the vehicle reaches a low bridge.

Although some examples are presented where the cam device 404 is performing checks for nearby low bridges, the same principles may be used when the comm device 402 performs the check for low bridges.

From operation 508, the method 500 flows to operation 510 to generate in-cab alerts when a low bridge is detected near the vehicle. When a low bridge is detected within the threshold distance, the system generates in-cab alerts to notify the driver. These alerts can be visual, auditory, or both and are designed to capture the driver's attention immediately. The purpose of this operation is to provide timely warnings to the driver, allowing them to take corrective action to avoid a collision.

From operation 510, the method 500 flows to operation 512 to notify the server of low-bridge events. In this operation, the vehicle's system notifies the behavioral monitoring system 206 of any low-bridge events detected during the trip. This notification can include details such as the location of the bridge, the time of detection, and the vehicle's response. The purpose of this operation is to keep Behavioral Monitoring System 206 informed of potential risks and incidents, enabling further analysis and response.

From operation 512, the method 500 flows to operation 514 to generate server alerts based on low-bridge events. Based on the notifications received from the vehicle, the behavioral monitoring system 206 may generate alerts for the fleet managers.

From operation 514, the method 500 flows to operation 516 for generating periodic reports regarding low-bridge events. The behavioral monitoring system 206 generates periodic reports regarding low-bridge events. These reports can include statistical analyses, trends, and recommendations for improving safety. The purpose of this operation is to provide insights and data-driven recommendations for enhancing road safety and preventing future collisions.

FIG. 6 is a user interface (UI 600) for configuring vehicle height, according to some examples. Vehicle height information can be entered through the user interface or via a bulk upload, e.g., by entering a CSV (comma-separated values) spreadsheet with the vehicle height information. This allows for the maximum height for vehicles and trailers to be specified, with the option for administrators to set the height associated with each.

Drivers can override these heights for specific trips using the walk-around feature. The driver app includes a flow for confirming vehicle height, with drivers typically verifying the height set by administrators. Deviations may occur due to added accessories or cargo that exceeds the maximum height. Once heights are defined, they need to be compared against bridge heights. More details on the driver app are provided below with reference to FIG. 7.

The UI 600 is designed to manage and configure the height of vehicles. The UI 600 is titled "Manage Asset Height" and includes a subtitle instructing the user to "Select the asset(s), then click edit to manage their heights."

The UI 600 is divided into two main tabs: "Vehicles" and "Trailers," each with a count indicator showing the number of items in each category (50 for both Vehicles and Trailers in this example). The "Vehicles" tab is currently active.

Below the tabs, there are several filter options, including "Tags," "Attributes," and "Vehicle Type," which allow the user to refine the list of vehicles displayed. A search bar is provided on the right side for quick searching of specific vehicles.

The main content area of the UI displays a table 602 with the following columns:
  Checkbox: Allows the user to select individual vehicles.
  Name: Displays the name of the vehicle (e.g., Vehicle 11111, Vehicle 2222).
  License plate: Shows the license plate number of the vehicle (e.g., 1M4509).
  Vehicle type: Indicates the type of vehicle (e.g., Automatic (Light Truck)).
  Camera: Displays the camera model, which is the cam device 404, associated with the vehicle (e.g., CM33).
  Tags: Shows any tags associated with the vehicle (e.g., London).
  Height (m): Displays the current height of the vehicle in meters (e.g., 2.5, 3.0).
  Last walkaround height (m): Shows the last recorded walkaround height in meters along with the time since the last update (e.g., 3.4 m, 2 days ago). The fleet administrator can validate height entries against minimum and maximum thresholds (e.g., two to five meters).

An alert icon 604 may be present if the driver has modified the height of the vehicle in the driver app.
  Edit button: Provides an option to edit the height configuration of the vehicle. If this option is selected, another UI will be presented to enter the height of the vehicle.

Each row in the table 602 represents a different vehicle, with the relevant information populated in the respective columns.

Above the table 602, pagination controls are provided to navigate through multiple pages of vehicle entries, with the current page indicated (e.g., 1 of 4).

Figure 7:
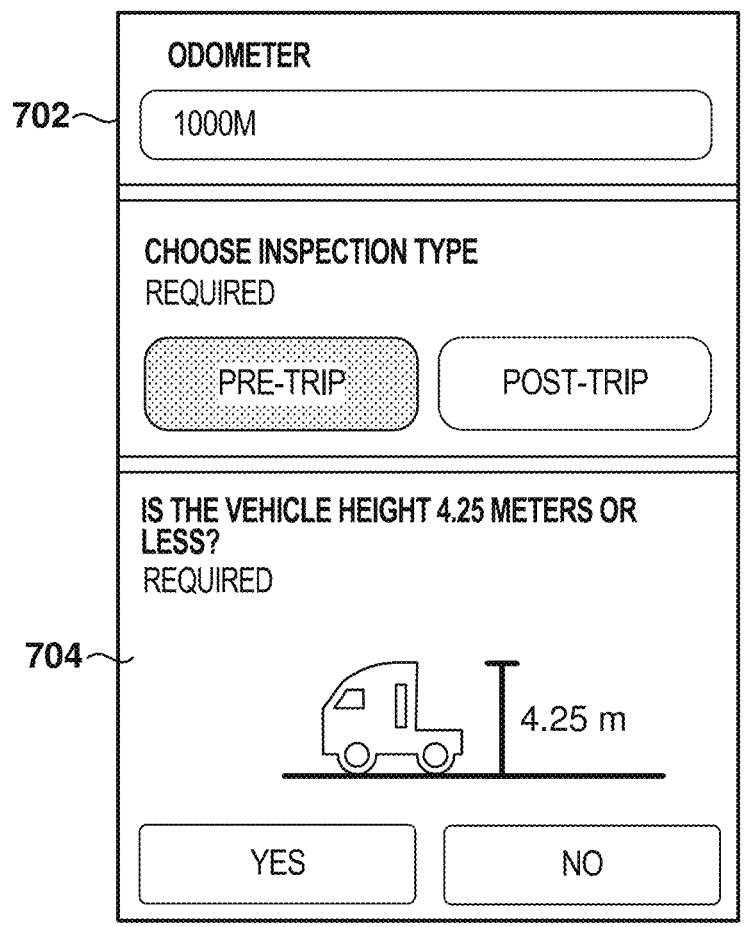
FIG. 7 shows a UI in a driver application for configuring the vehicle's height according to some examples.

FIG. 7 shows a UI 702 in a driver application for configuring the vehicle's height according to some examples. The UI 702 interface is part of the driver application and includes an option for configuring the vehicle's height. In some examples, the UI 702 includes additional options (not shown) for a driver walkthrough before starting a trip. The UI 702 shows a subset of these options.

The upper section of the interface features an information field labeled "Odometer (mi)," which displays the vehicle's current odometer reading. In the example shown, the odometer reading is "1000 m."

Below the odometer information, the interface presents a section for selecting the inspection type. This section includes a prompt "Choose inspection type" followed by a "Required" indicator to denote that this input is mandatory. Two option buttons are provided for the user to select the type of inspection: a "Pre-Trip" button (currently selected) and a "Post-Trip" button.

A section 704 is for configuring the vehicle height. It includes a prompt "Is the vehicle height 4.25 meters or less?" accompanied by a "Required" indicator, signifying that this input is also mandatory. Below this graphic, two option buttons are provided for the user to respond: a "Yes" button and a "No" button.

If the user selects the No button, another UI is presented for entering the new vehicle height, which includes the option to enter the vehicle height and another option to indicate the reason for the change in the maximum height, e.g., equipment/loads increased height, recorded maximum height is not accurate, and other reason.

As discussed above, with reference to FIG. 6, the administrator can view the override and see the driver's reasoning by hovering over the alert icon 604. This visibility allows the administrator to understand why the change was made. In some examples, the override is reset with each new driver walk-around.

Figure 8:
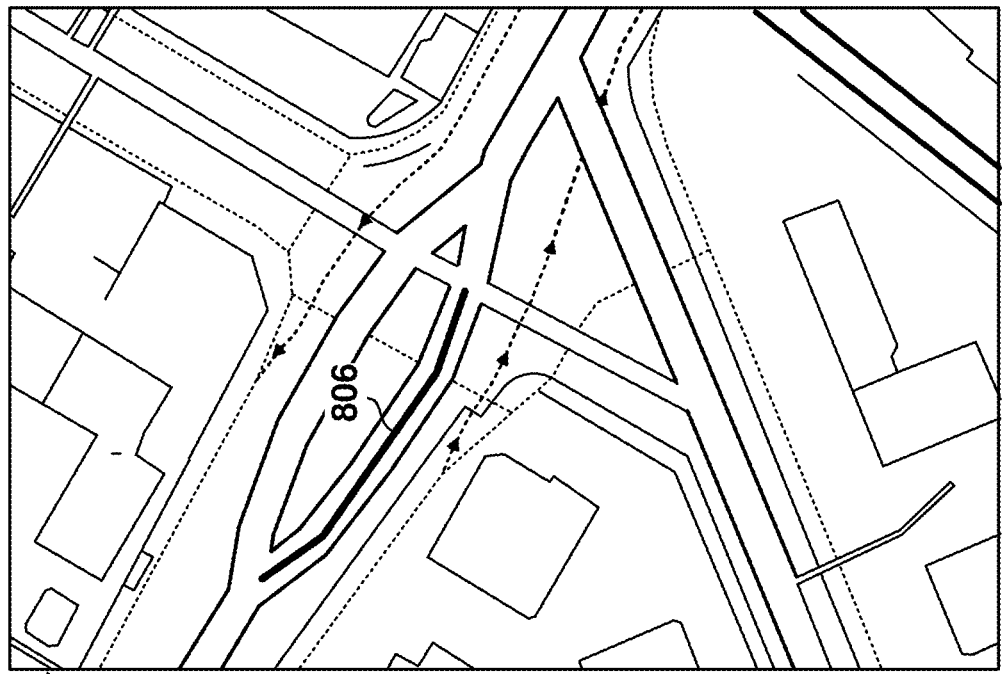
FIG. 8 illustrates the data stored in a map tile regarding segments with bridges and segments near bridges, according to some examples.

FIG. 8 illustrates the data stored in a map tile regarding segments with bridges and segments near bridges, according to some examples. The solution for avoiding bridge collisions utilizes data on the maximum height of bridges, which is downloaded to the vehicle and stored in a map tile. More details regarding the map tiles are provided below with reference to FIGS. 14 and 15.

A map 802 highlights segments with a bridge and the nearby roads. A line 806 indicates that the section of the street is passing under a bridge. In some examples, the bridge data is based on data sourced from Open Street Map (OSM), but other data sources may be used instead or additionally. The data for each bridge is integrated with the map tiles and appended with new information related to segment IDs, specifically focusing on the height of the bridges.

The left side of the figure presents a table 804 containing data on segments with bridges, including the distance in segments to bridges. The table 804 includes columns for segment ID, bridge segment ID, bridge node ID, parent node ID, segments away, and distance from the parent node to the bridge node.

The segment ID (SEG ID) is the identifier for the segment, and the bridge segment ID (BR_SG_ID) is the bridge's ID, directly or via connected roads. Further, the bridge node ID (BR_NODE_ID) is the node where the bridge starts. The parent node ID (PARENT_ND_ID) is for indirect paths and is the node where you continue heading to the bridge. This value is equal to the bridge node ID for direct connections.

The segments away (SGS AWAY) indicates the degree of connectivity of the segment to the bridge, where the value is 1 for a direct connection and a higher value depending on the number of segments to get to the bridge.

The distance from the parent node to the bridge node (DISTANCE PARENT NODE TO BRIDGE NODE) is the total distance to get to the bridge, measured by lengths of ways polylines in-between.

With this table 804, the system can quickly alert drivers when they're approaching a low bridge, considering the vehicle's height and the bridge's clearance. By looking up the latitude and longitude of the vehicle, the table 804 is used to determine the approximate distance of the vehicle to potential bridge hazards.

Figure 9:
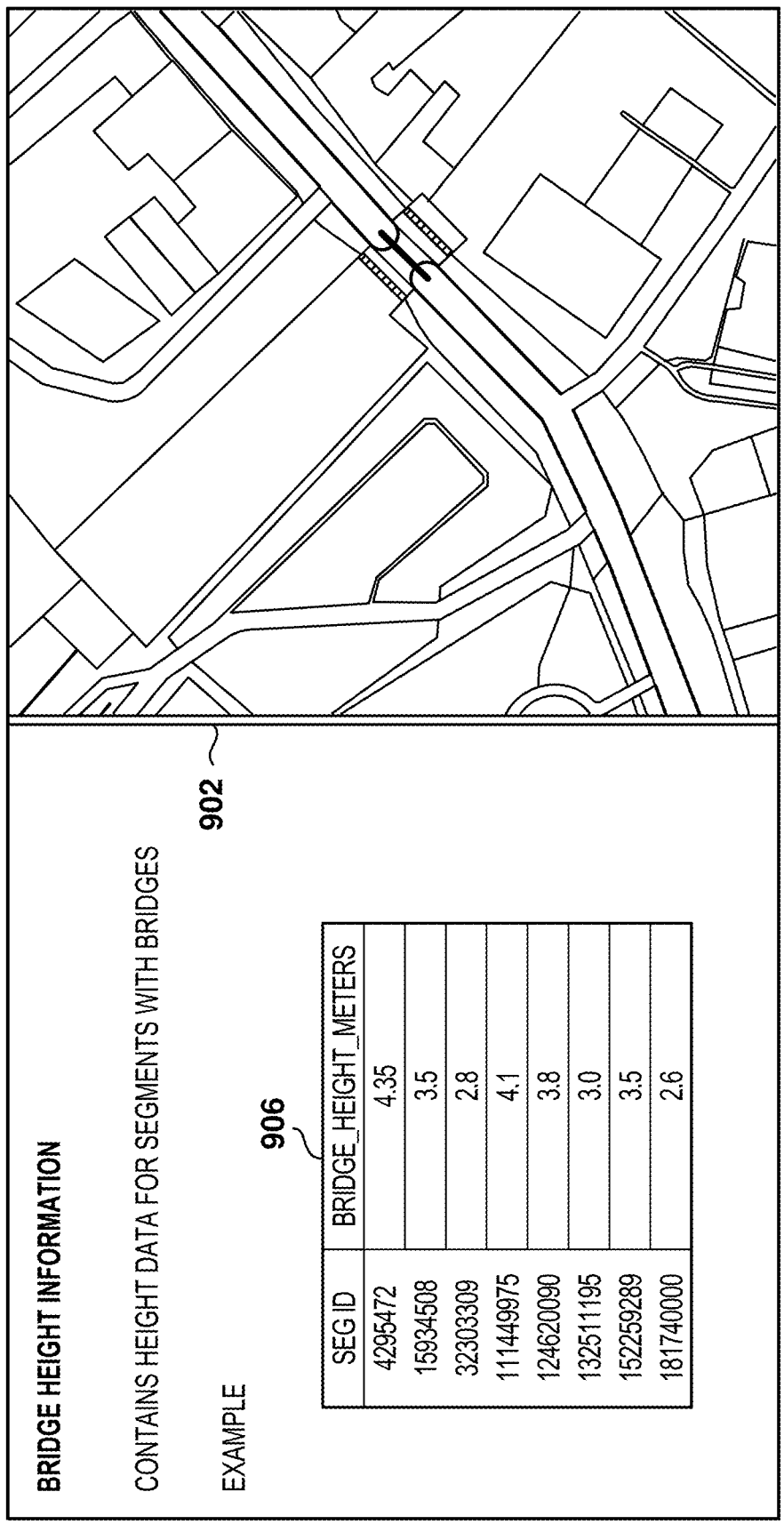
FIG. 9 illustrates a table for storing bridge height, according to some examples.

FIG. 9 illustrates a table 904 for storing bridge height, according to some examples. The table 904 contains height data for various bridge segments identified by their segment IDs. Each row in the table corresponds to a specific bridge segment and includes the segment ID along with the associated bridge height in meters.

A map 902 shows the location of the segment with the bridge, providing a visual representation of the bridge's location.

The table 904 is created by translating the locations of the bridges (e.g., latitude and longitude) and mapping these locations to the corresponding segment.

Subsequently, the bridge height information from OSM is linked to each segment based on the corresponding segment ID. Following the creation of the table 904, the system considers adjacent segments and determines the distance at which a driver should be alerted, not just when approaching a specific segment but when a certain distance away (e.g., 150 meters). This approach involves analyzing a combination of segments to determine the warning distance as discussed in more detail below with reference to FIG. 10.

Figure 10:
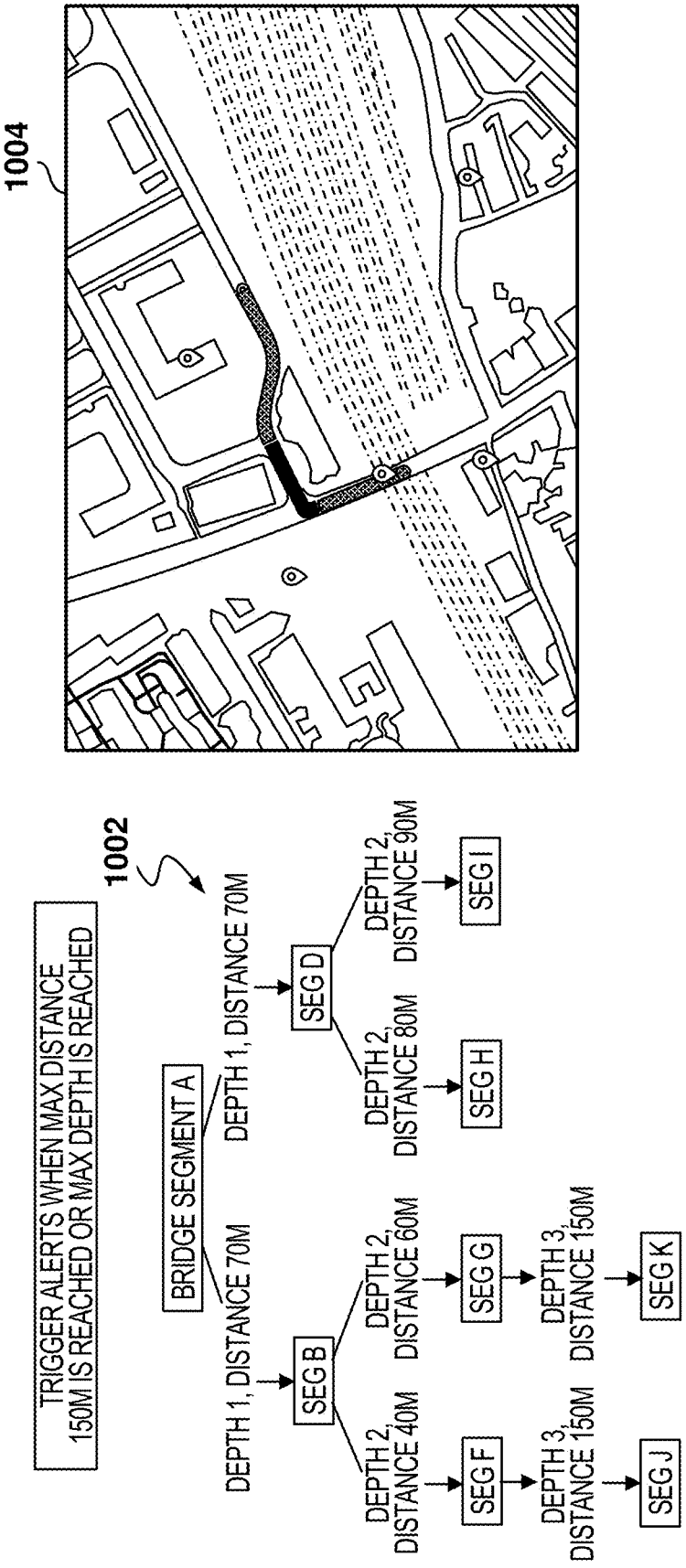
FIG. 10 illustrates a process for determining when to warn a driver based on the segment's proximity to a nearby segment with a bridge, according to some examples.

FIG. 10 illustrates a process for determining when to warn a driver based on the segment's proximity to a nearby segment with a bridge, according to some examples. FIG. 10 includes a decision tree diagram 1002 and a map 1004.

The decision tree diagram 1002 is used to determine when to trigger alerts based on distance to the bridge and depth criteria. The topmost node of the tree represents "Bridge Segment A," which is the segment where the bridge is located. Under each node, the nodes corresponding to directly connected nodes are included, with information on the distance to the segment associated with the parent node. Thus, from the topmost node, two branches extend:
Depth 1, Distance 50 m to "Segment B," and
Depth 1, Distance 70 m to "Segment D."
From "Segment B," two further branches extend:
Depth 2, Distance 40 m to "Segment F," and
Depth 2, Distance 60 m to "Segment G."
From "Segment D," two further branches extend:
Depth 2, Distance 80 m to "Segment H," and
Depth 2, Distance 90 m to "Segment I."

From "Segment F," "Segment G," "Segment H," and "Segment I," additional branches extend, labeled as Depth 3, Distance 150 m leading to "Segment J" and "Segment K."

Given a threshold distance for generating alerts, the nodes within that threshold distance may be determined by generating the decision tree diagram 1002 because nodes beyond that distance will not be included. If a node is in the tree for the given bridge, then this information is noted in the information about the segment stored in the tile where the segment is located. Thus, once a segment is reached by a vehicle, it is fast to determine if a bridge alert will be generated simply by accessing the data in the segment (as illustrated in FIG. 8) without doing further calculations associated with bridge segments.

The map 1004 highlights a specific route from the current segment to the bridge. Key landmarks and street names are visible on the map, such as "Grant Road" and "Londis." The map also includes markers indicating specific points of interest or potential alert locations.

This approach enables the exclusion of nearby street segments that will not impact the driver's ability to reach the intended road. If a geofence were used, a truck may be near a bridge (e.g., on a parallel freeway), but the truck may require a long route to get to that bridge. With the geofence, the alert would be triggered, but with the current approach based on segments, the alert will only be generated if the actual in-route distance to the bridge is below the threshold.

By focusing on specific segments and intersections, false positive alerts are minimized. Alerts are triggered when the driver is on a particular segment, providing them with enough time to turn onto a side street and avoid blocking traffic in front of the bridge.

Additionally, the system considers directionality to avoid unnecessary alerts when vehicles are simply passing by adjacent roads. However, alerts should be activated if there is a possibility of vehicles turning onto these roads to provide timely warnings.

Upon entering a segment that is within the threshold distance, the alert is triggered instantly. In some examples, the map tiles are stored on the cam device 404, enabling the alert to be sent almost immediately without the need to contact the server. This rapid alert generation provides ample time for reaction and allows for a more precise distance-to-bridge approach. One goal is to ensure drivers have sufficient time to react without receiving alerts too far in advance, which could lead to them disregarding future alerts as false positives.

Figure 11:
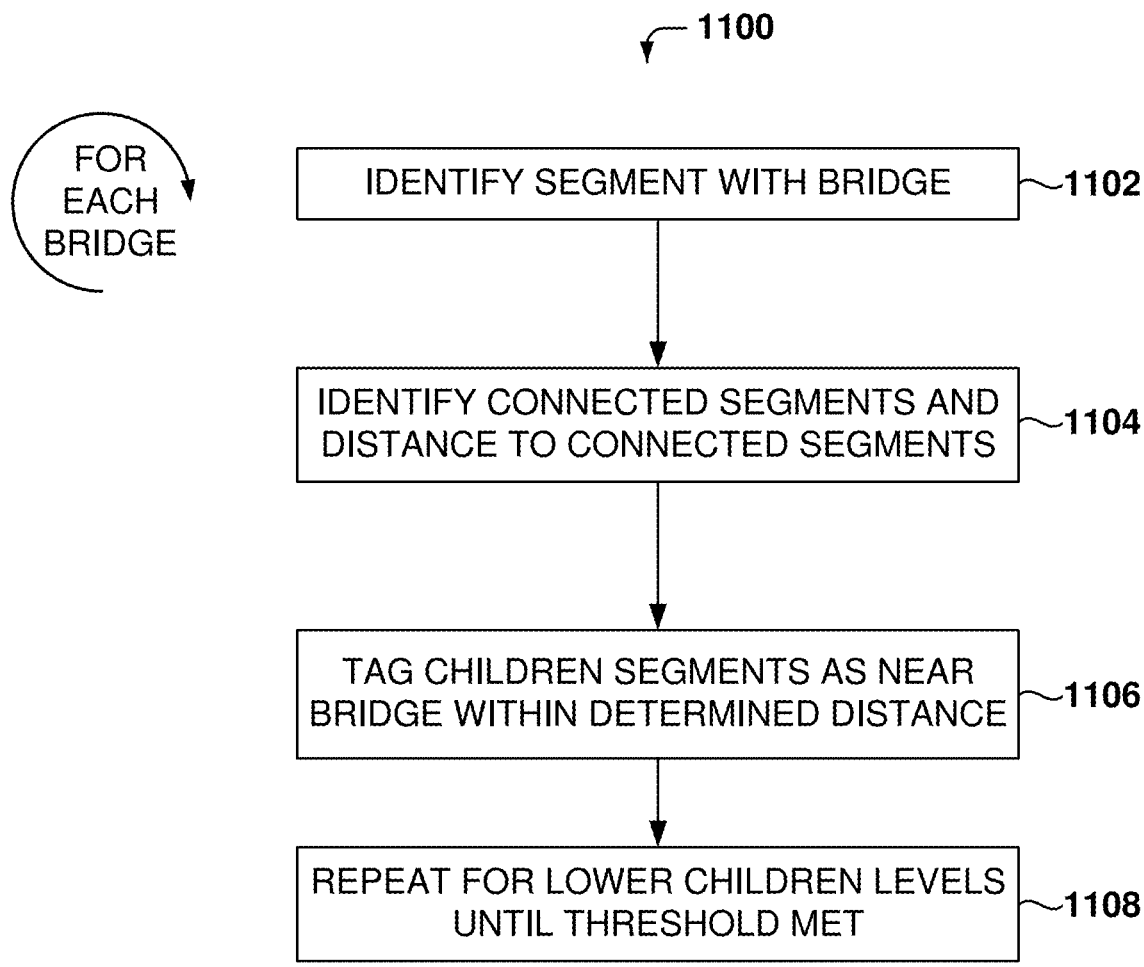
FIG. 11 is a flowchart of a method for adding bridge information to segments in tiles, according to some examples.

FIG. 11 is a flowchart of a method 1100 for adding bridge information to segments in tiles, according to some examples. While the various operations in this flowchart are presented and described sequentially, one of ordinary skill will appreciate that some or all of the operations may be executed in a different order, be combined or omitted, or be executed in parallel.

The operations of the method 1100 are performed for each bridge to build the bridge tables for all the segments in the desired region (e.g., country, continent).

Operation 1102 is for identifying the segment that contains a bridge.

From operation 1102, the method 1100 flows to operation 1104 to identify connected segments and the distance to connected segments. Once the segment with the bridge is identified, the operation 1104 involves identifying the segments that are connected to the bridge segment and determining the distance to these connected segments. This can be achieved by using the decision tree diagram 1002 of FIG. 10.

From operation 1104, the method 1100 flows to operation 1106 to tag children segments within a predetermined distance as being near the bridge. In this operation, the system tags the child segments that are within a predetermined distance from the bridge segment. This tagging process involves marking the segments in the database to indicate their proximity to the bridge. In some examples, the table 804 of FIG. 8 is stored in the tile.

The computer system uses the distance calculations from the operation 1104 to determine which segments fall within the specified range and updates their metadata in the tile to reflect their proximity to the bridge.

From operation 1106, the method 1100 flows to operation 1108 to repeat the tagging process for lower levels of child segments until a specified threshold is met. Thus, the tagging is repeated for lower children levels in the decision tree diagram 1002 until the threshold is met (e.g., 250 meters distance from the bridge). This means that segments beyond the threshold distance will not be tagged with the bridge information, and the system continues to propagate the bridge proximity information down the hierarchy of segments, ensuring that all relevant segments are tagged appropriately. The computer system iterates through the child segments, applying the same distance calculations and tagging logic until the threshold condition is satisfied.

The heights and distances are appended to map tiles loaded on the device. The map tiles show the current segment tile and evaluate if action is needed based on available bridge height. As discussed above, the information on the tile includes the maximum height and whether it is on the current or adjacent segment. The system maps adjacent tiles to determine when to trigger an alert.

In some examples, the alert will be integrated into a turn-by-turn navigation experience, providing timely notifications to reroute if necessary. More details regarding alerts for routes are provided below with reference to FIG. 13. Additionally, alerts will be sent to planners or dispatchers for routes that pose a risk of encountering low bridges, prompting them to adjust the route accordingly.

Figure 12:
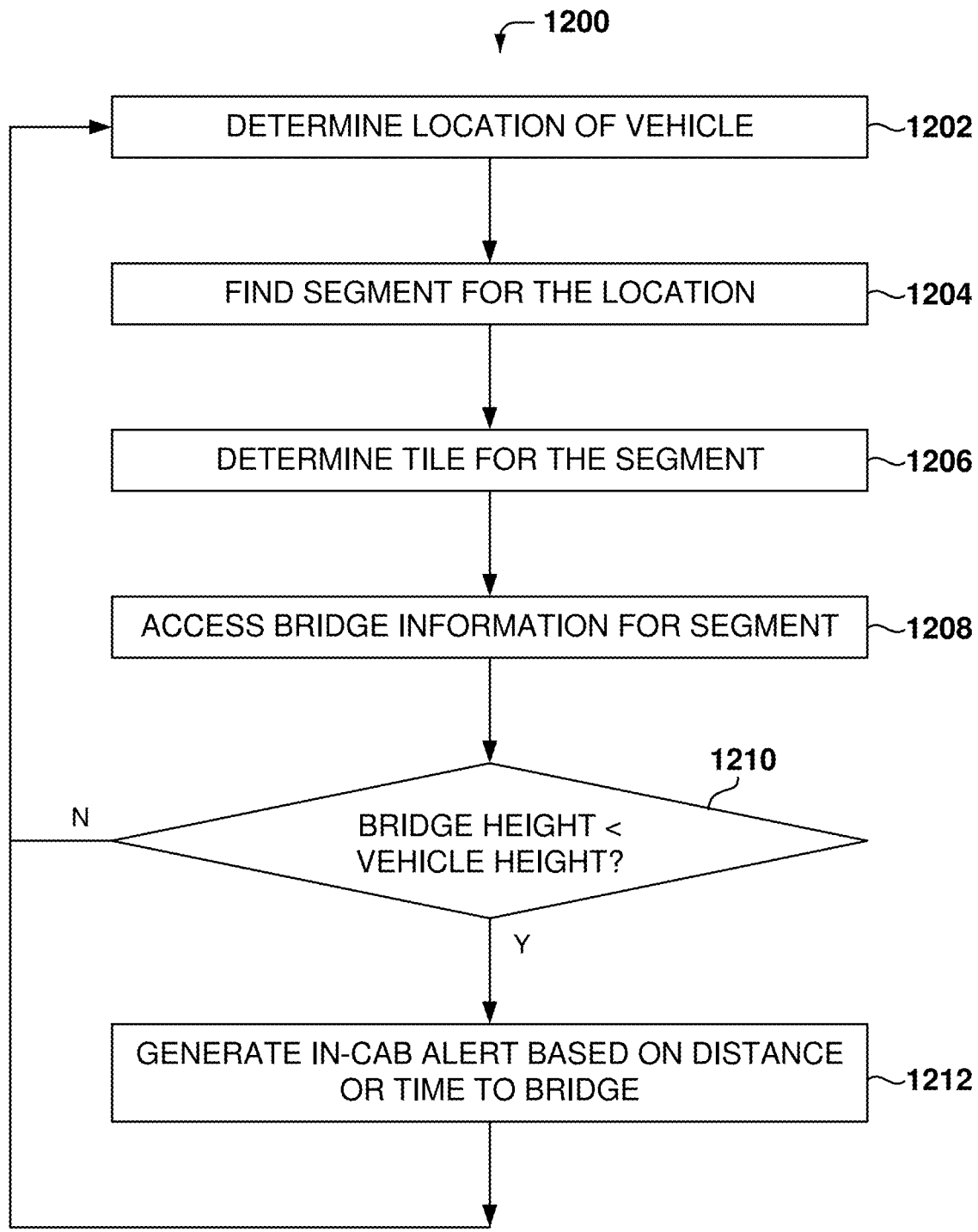
FIG. 12 is a flowchart of a method for generating in-cab alerts, according to some examples.

FIG. 12 is a flowchart of a method 1200 for generating in-cab alerts, according to some examples. While the various operations in this flowchart are presented and described sequentially, one of ordinary skill will appreciate that some or all of the operations may be executed in a different order, be combined or omitted, or be executed in parallel.

The method 1200 for detecting low bridges involves examining bridge nodes and their corresponding IDs to assess vehicle height against a specified dangerous distance threshold. If the vehicle height falls within this threshold, a low bridge strike alert event is triggered.

Operation 1202 is to determine the location of the vehicle, such as by getting GPS data from the GPS receiver included in the cam device 404.

From operation 1202, the method 1200 flows to operation 1204 for determining the segment for the location of the vehicle based on the GPS data. For example, a mapping application such as OSM may be used to determine the segment. In this operation, the system determines the specific road segment on which the vehicle is traveling.

From operation 1204, the method 1200 flows to operation 1206 for determining the map tile corresponding to the segment. The bridge information for the segment is kept in the map tile.

From operation 1206, the method 1200 flows to operation 1208 to access bridge information in the segment, such as by accessing data from the table 804 of FIG. 8 that includes the bridge segment ID and the number of segments away from the bridge. Further, table 904 of FIG. 9 may be accessed to determine the height of the bridge based on the segment ID where the bridge is.

From operation 1208, the method 1200 flows to operation 1210, which is a decision point to compare the height of the bridge to the height of the vehicle. If the bridge height is less than the vehicle height, the system proceeds to operation 1212. If the bridge height is not less than the vehicle height, the method flows back to operation 1202. The purpose of this decision point is to determine if there is a potential clearance issue that requires an alert.

From operation 1210, the method 1200 flows to operation 1212 for generating the in-cab alert based on the distance or time to the bridge. In some examples, the threshold to generate the alert is based on the distance to the bridge, but other examples may utilize other thresholds, such as the time it would take the vehicle to reach the bridge at the current speed.

If a low bridge is detected (e.g., the bridge height is less than the vehicle height), the system generates an in-cab alert for the driver. This alert can be based on the distance to the bridge or the estimated time to reach the bridge, providing the driver with sufficient warning to take appropriate action.

Below is a sample low-bridge detection algorithm pseudocode:

type WayId int
type BridgeConnection struct {
    BridgeWayID int
    BridgeNode int
    ParentNode int
    WaysAway int
    WaysInBetweenLength int
    Bridge WayStreetName string
}
//Note: All length measurements are assumed to be in meters.
heightBuffer:=0.5//Safety margin for vehicle height.
dangerousDistanceToBridgeThreshold:=100
vehicleHeight:=configManager. Get VehicleHeight ( )
/*

| seg_id | br_sg | br_nd | prnt_nd | sgs away | segs in betwn 1gth | brdg street |
|---|---|---|---|---|---|---|
| 2 | 1 | 101 | 101 | 1 | 0 | Main St |
| 5 | 1 | 100 | 100 | 1 | 0 | Elm St |
| 9 | 10 | 96 | 93 | 1 | 0 | Oak St |
| 11 | 10 | 999 | 999 | 1 | 0 | Pine St |
| 3 | 1 | 101 | 102 | 2 | 10 | Cedar Sl |
| 6 | 1 | 100 | 99 | 2 | 10 | Birch St |
| 7 | 1 | 100 | 98 | 3 | 15 | Maple St |

```
|    4 |    1 |   101 |   103 |     3 |        25 | Cherry St |
+ ------ + -------- + ------- + --------- + ---------- + ------------- + ------------- +
```

This table represents bridge roads and their network of connected roads (segments) up to several levels (segments_away) for the lookup process, provided by map tiles generation notebook.

```
*/
//This sample lookup table code is represented as it would
   be derived directly from map tile proto.
lookupTable:=map [WayId] [ ] BridgeConnection {
  2: {{BridgeWayID: 1, BridgeNode: 101, ParentNode:
      101, WaysAway: 1, WaysInBetweenLength: 0,
      Bridge WayStreet: "Main St"}}
  5: {{BridgeWayID: 1, BridgeNode: 100, ParentNode:
      100, WaysAway: 1, WaysInBetweenLength: 0,
      Bridge WayStreet: "Elm St"}}
  9: [{BridgeWayID: 10, BridgeNode: 93, ParentNode:
      93, WaysAway: 1, WaysInBetweenLength: 0, Bridge
      WayStreet: "Oak St"}} . . .
}
//The following code below can occur, for example, in a
   polling function:
   current WayID:=WayId (osrm.FetchCurrentWayID ( )
currentGpsPosLatLng:=gpsManager.getLatLng ( )
if bridgeConnections, ok:=lookup Table [current WayID];
   ok {
   for _, bridgeConnection:=range bridgeConnections {
      //Retrieves the latitude and longitude for the entrance
         of the way leading to the bridge.
      parentNodeLatLng:=nodeTable[bridgeConnection.
         ParentNode].   LatLng//ParentNode   equals   to
         BridgeNode for
//Check if the bridge clearance poses a risk.
if vehicleHeight+heightBuffer<
      bridgeTable [bridgeConnection.BridgeWayID].Height
         {
      continue
   }
//Get the distance to the dangerous bridge way entrance.
distanceToTheBridge Way:=
      geoutils.DistanceBetween (currentGpsPosLatLng,
      parentNodeLatLng)+BridgeConnection
//Triggers an alert if: 1) the current way is directly
   connected to the
//bridge, or 2) it's indirectly connected and the total
   distance to the
//bridge is within a specified threshold.
if bridgeConnection. WaysAway==1||distanceTo TheBri-
   dge Way<=
   dangerousDistanceToBridgeThreshold {
alertsManager.enqueueAudibleAlert(bridgeConnection.
   BridgeWay
      StreetName, distanceToTheBridgeWay)
   objectStatsManager.emit (objectstats.
      ObjectStat_LowBridgeStrikeEvent,
      bridgeConnection.BridgeWayID, distance)
      }
   }
}
```

Figure 13:
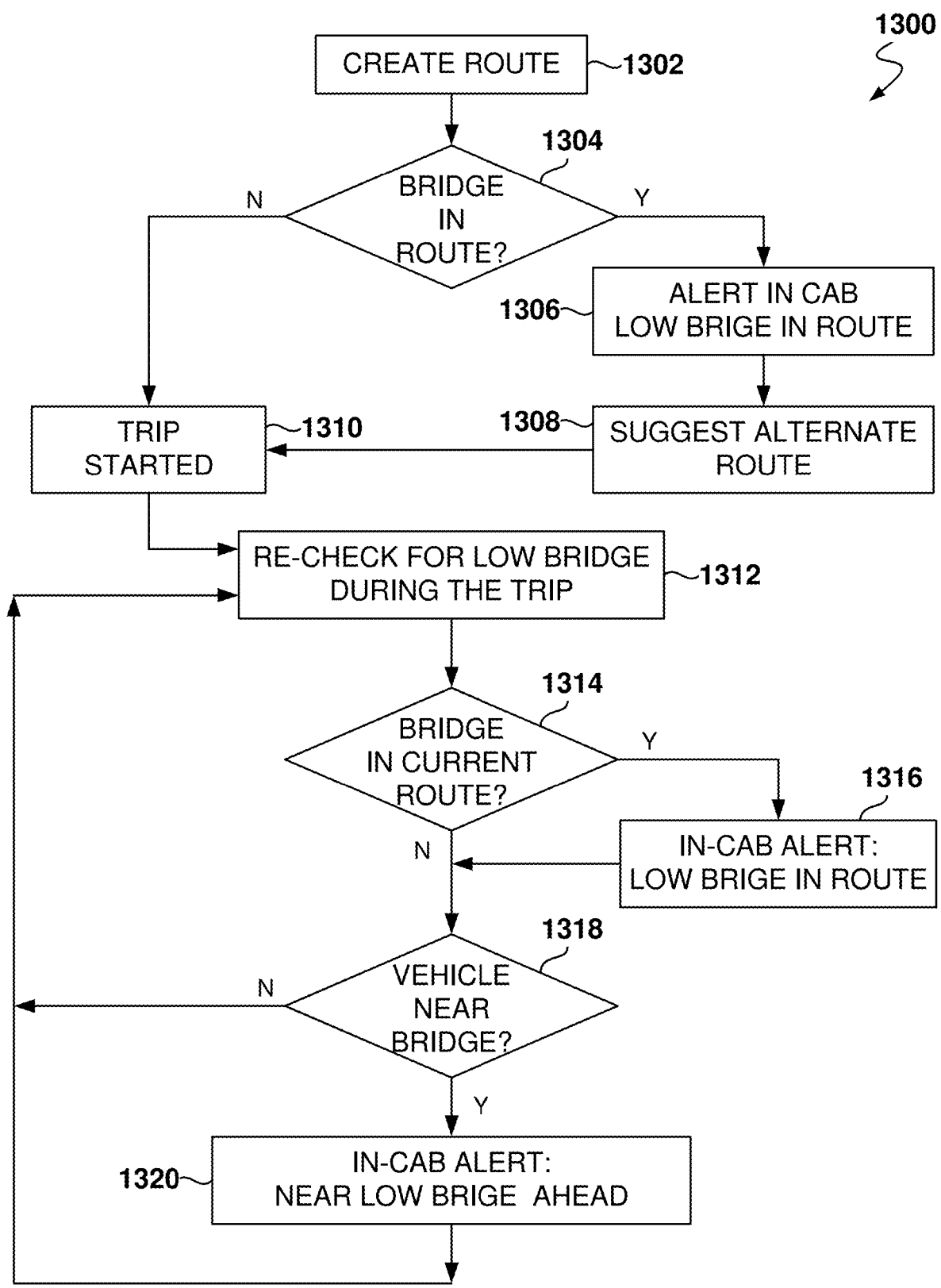
FIG. 13 is a flowchart of a method for generating alerts when a planned route includes a possible collision with a bridge, according to some examples.

FIG. 13 is a flowchart of a method 1300 for generating alerts when a planned route includes a possible collision with a bridge, according to some examples. While the various operations in this flowchart are presented and described sequentially, one of ordinary skill will appreciate that some or all of the operations may be executed in a different order, be combined or omitted, or be executed in parallel.

Operation 1302 is for creating a route, e.g., by inputting the starting point and destination into a navigation system, which then calculates the route.

From operation 1302, the method 1300 flows to operation 1304 to check if there is a bridge along the planned route. This decision point involves analyzing the route data to identify any bridges that the vehicle will encounter. If no bridge is detected (N), the method 1300 proceeds to operation 1310. If a bridge is detected (Y), the method 1300 moves to operation 1306.

At operation 1306, the system generates an in-cab alert to inform the driver of the low bridge. This alert is crucial for ensuring the driver is aware of potential hazards ahead, particularly if the height of the vehicle may pose a risk of collision with the bridge.

From operation 1306, the method 1300 flows to operation 1308 to suggest an alternate route following the alert to avoid the low bridge. This operation involves recalculating the route to find a path that bypasses the bridge, ensuring the safety of the vehicle and its occupants.

From operation 1308, the method 1300 flows to operation 1310, where the trip is started.

From operation 1310, the method 1300 flows to operation 1312 for re-checking for low bridges during the trip. As the trip progresses, the system continuously re-checks for low bridges in the remaining segments of the route. In some examples, if no route is configured, the operations related to the route are skipped, and the method 1300 checks for low bridges in the proximity as the vehicle travels.

From operation 1312, the method 1300 flows to operation 1314 to check if there is a bridge in the current route. If no bridge is detected (N), the method 1300 proceeds to operation 1318. If a bridge is detected (Y), the method 1300 moves to operation 1316. Rechecking the route for bridges during the trip is valuable because the route may change along the trip (e.g., the driver takes a detour, change of route due to traffic, or a roadblock), so rechecking the route periodically may detect a low bridge even if there was no low bridge detected during the initial route.

At operation 1316, an in-cab alert is generated for a low bridge detected in the current route to inform the driver of the low bridge in the route. It is noted that the bridge may be far away from the vehicle (e.g., 100 Km), but the driver may be notified early in advance, as compared to proximity alerts, such as the one for operation 1320.

At operation 1318, a check is made to determine if the vehicle is near a bridge. This decision point involves determining the proximity of the vehicle to the bridge to assess the urgency of the alert. In this operation, the bridge data for the current segment is obtained from the current segment, and the data is checked to determine if there is a bridge within the predetermined threshold distance.

If the vehicle is not near the bridge (N), the method 1300 proceeds back to operation 1312. If the vehicle is near the bridge (Y), the method 1300 moves to operation 1320.

At operation 1320, an in-cab alert is generated for a nearby low bridge to inform the driver of the imminent low bridge. This alert is critical for immediate action, ensuring the driver can take the necessary measures to avoid a collision. From operation 1320, the method 1300 flows back to operation 1312.

Figure 14:
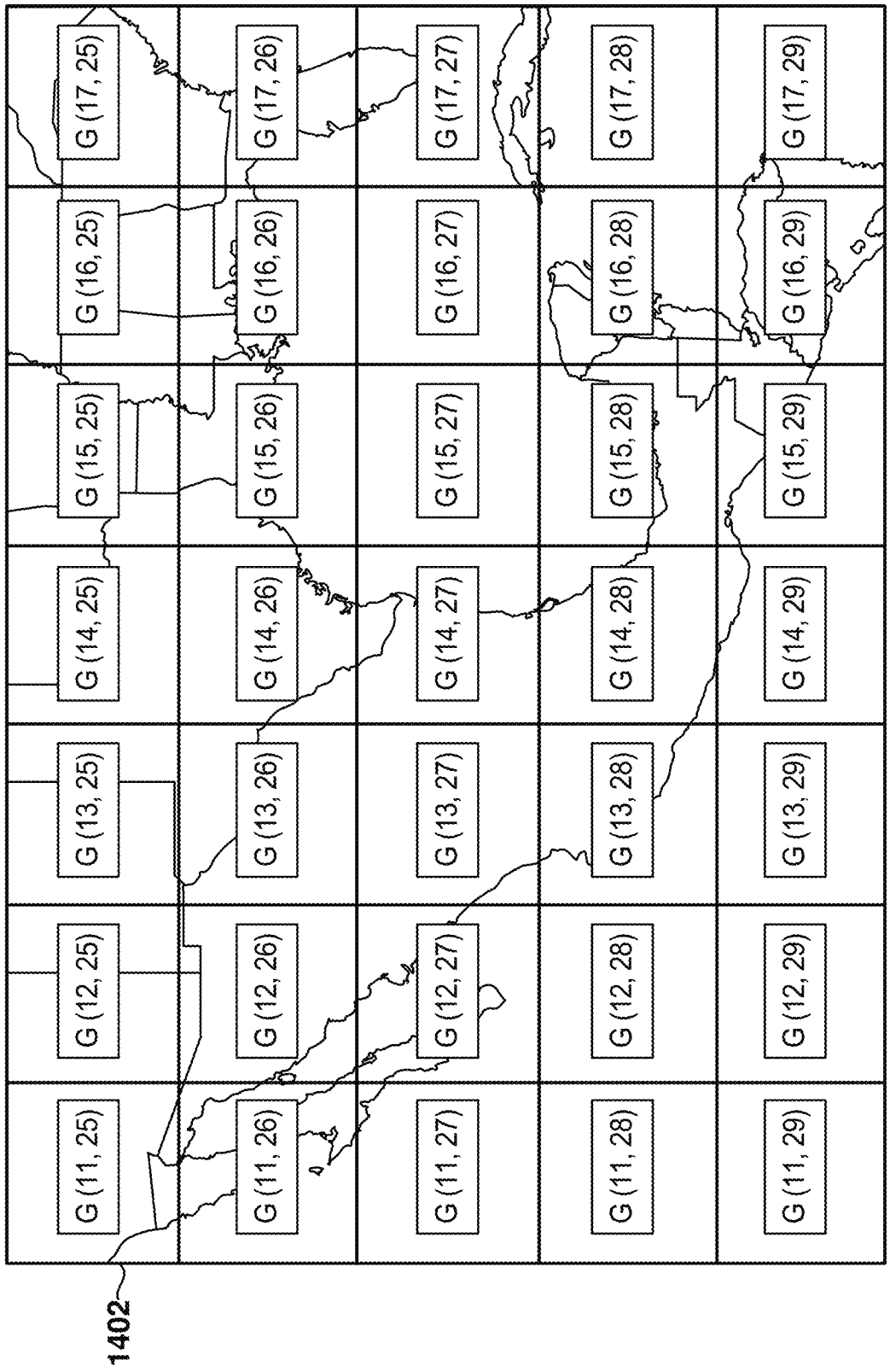
FIG. 14 illustrates the tile structure of a zoomable map, according to some examples.

FIG. 14 illustrates the tile structure of a zoomable map 1402, according to some examples. A data structure is created to store map information and metadata related to a location, such as bridge information and segment information. In some examples, two components are part of the solution: a quadtree and Slippy tiles.

The quadtree is commonly employed in graphics to efficiently partition the area of interest into smaller segments for swift navigation. In one implementation, the quadtree functioned adequately with quick wake-up times; however, it was found to consume a large amount of memory. A modified quad-tree is presented to overcome this problem by storing less data in each node of the tree.

The quadtree is used for partitioning a two-dimensional space by recursively subdividing it into four quadrants or regions. The quadtree has the following three properties:

1. Nodes and children: Each node in a quadtree has zero or four children. If a node has children, it is subdivided into four equal quadrants. In some examples, a modified version of the quadtree is used, where a node may have from zero to four children, e.g., if a child node would only cover an area where immobilization is not enabled, then this node is not created. This means that when traversing the tree, if the location of the vehicle is not within a node of the tree, then this would mean that immobilization is not allowed.

2. Recursive subdivision: The space is recursively divided into zero to four quadrants until a specific condition is met, such as a maximum depth or a minimum tile size has been reached.

3. Representation of space: The root node represents the entire space, and each subsequent level of nodes represents progressively smaller subdivisions of the space.

Slippy tiles are a method used to manipulate maps in a way that allows for smooth panning and zooming. Slippy Tiles have the following three characteristics:

1. Tile-based system: the map is divided into a grid of square tiles (typically 256×256 pixels in size), and each tile represents a part of the map at a specific zoom level. In some examples, Slippy tiles for areas where immobilization is not enabled are not created.

2. Zoom levels: the map can be viewed at various zoom levels, with each zoom level providing a different level of detail. At higher zoom levels, the map is divided into more tiles, allowing for more detailed views. At zoom level 0, the whole world is a single tile with coordinates (0, 0). At zoom level 1, the world is covered by four tiles; at zoom level 2, it is covered by 16 tiles, and so forth. At zoom level 15, the area covered by a tile is about 1 square kilometer, which is enough resolution for most applications. However, other applications may use the smallest tiles at a different zoom level.

3. Tile naming and retrieval: tiles are usually named based on a coordinate system (x, y) and a zoom level (z). This allows for easy retrieval of specific tiles.

Figure 15:
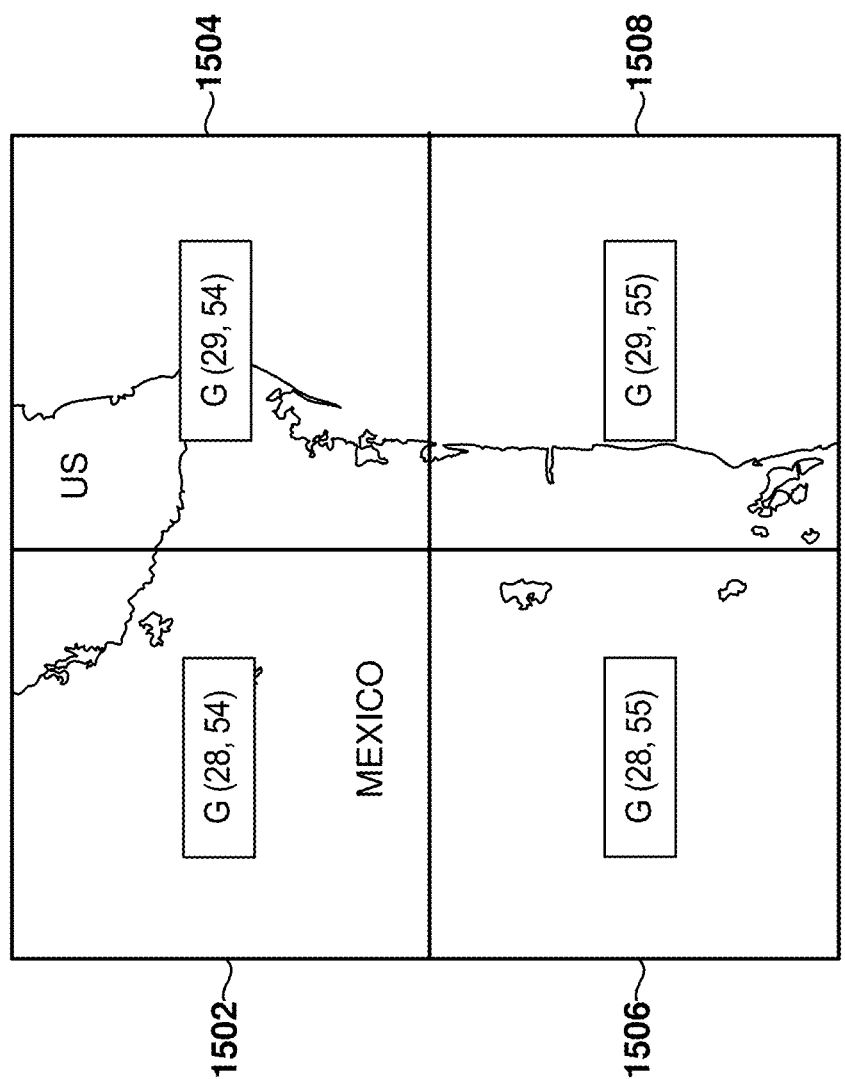
FIG. 15 shows details of a tile at zoom level 7, according to some examples.

The entire map is treated as a grid. At zoom level 0, the entire map fits into a single tile. At zoom level 1, the map is divided into four tiles (2×2 grid), and so on, with each subsequent zoom level doubling the number of tiles along each axis. FIG. 14 shows a section 102 of a tiled map at zoom level 6, and FIG. 15 shows details of a tile at zoom level 7.

Each tile is identified by its x and y coordinates within the grid at a particular zoom level. For example, a tile at zoom level 3 with coordinates (2, 1) can be uniquely identified and loaded. Using the zoom level and the x and y coordinates of a tile, the geographic coordinates of the tile can be calculated.

In some examples, Google coordinates are used, but other implementations may use other coordinates, such as Tile Map Service (TMS) tiles. Google Maps utilizes a Spherical Mercator projection, and the entire world looks like a square, making it easy to work with on a computer.

The Google coordinates, also referred to herein simply as coordinates unless otherwise specified, include the x and y parameters as well as the zoom level. In FIG. 14, the top left tile has coordinates (11, 25), and the y coordinate increases as for the tiles below, such as (11, 26), (11, 26), etc. Further, the nodes to the right have increasing x coordinates, such as (12, 25), (13, 25), etc.

In some examples, segment data is stored in the tile, indicating which segments are included within the tile, and bridge data, such as the table 804 of FIG. 8. The segment data is stored in a tile at the greatest zoom level where the segment is contained within the tile, but children tiles would not include the complete segment. The bridge data in the tile covers all the segments in the tile that are in proximity to a bridge.

FIG. 15 shows details of a tile at zoom level 7, according to some examples. Tile 1502 includes part of Mexico and part of the United States. Tile 1504 covers Mexico, the United States, and water. Tile 1506 covers Mexico, and tile 1508 covers land in Mexico and water areas.

Figure 16:
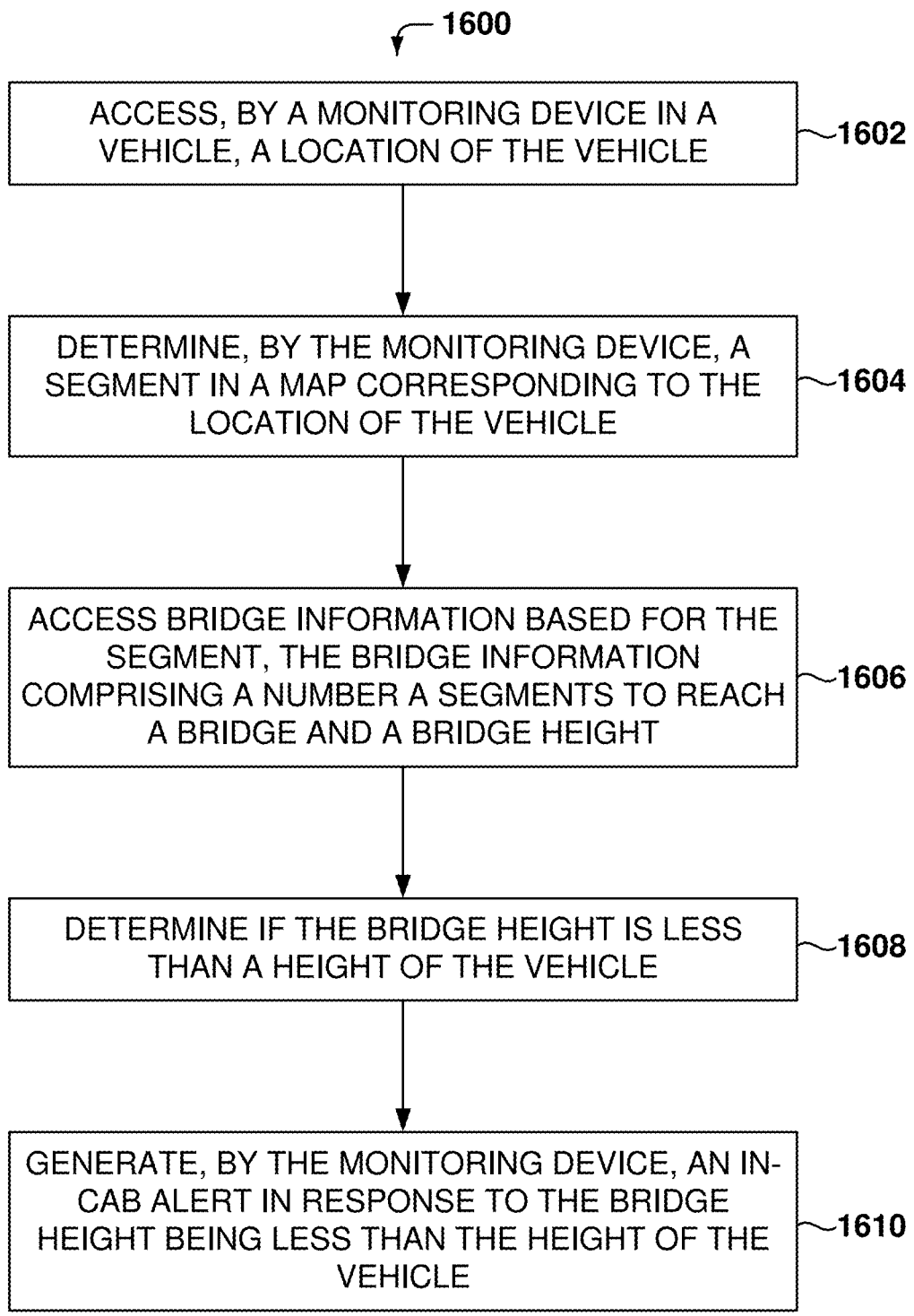
FIG. 16 is a flowchart of a method for generating alerts when a truck may collide with a low-clearance bridge, according to some examples.

FIG. 16 is a flowchart of a method 1600 for generating alerts when a truck may collide with a low-clearance bridge, according to some examples. While the various operations in this flowchart are presented and described sequentially, one of ordinary skill will appreciate that some or all of the operations may be executed in a different order, be combined or omitted, or be executed in parallel.

Operation 1602 is for accessing, by a monitoring device in a vehicle, a location of the vehicle.

From operation 1602, the method 1600 flows to operation 1604 for determining, by the monitoring device, a segment in a map corresponding to the location of the vehicle.

From operation 1604, the method 1600 flows to operation 1606 for accessing bridge information based on the segment, the bridge information comprising a number of segments to reach a bridge and a bridge height.

From operation 1606, the method 1600 flows to operation 1608 for determining if the bridge height is less than a height of the vehicle.

From operation 1608, the method 1600 flows to operation 1610 for generating, by the monitoring device, an in-cab alert in response to the bridge height being less than the height of the vehicle.

In some examples, the bridge information is in a table comprising fields for segment identifier (ID), bridge ID, bridge node ID where the bridge is located, parent ID of the node to reach the bridge, and the number of segments to reach the bridge.

In some examples, the in-cab alert is generated when a distance to the bridge from the location of the vehicle is less than a predetermined threshold.

In some examples, accessing bridge information further comprises: accessing data of a map organized in a quadtree tile structure comprising tiles at multiple zoom levels and determining a tile corresponding to the segment.

In some examples, the bridge information is stored in a table in the tile corresponding to the segment.

In some examples, the method 1600 further comprises: generating, by a server, the bridge information for the bridges in a geographical area, where generating the bridge information for each bridge comprises: identifying bridge segment of the bridge; identifying connected segments to the bridge segment; and storing bridge segment information in the connected segments within a predetermined distance from the bridge.

In some examples, the method 1600 further comprises receiving, by the monitoring device, the bridge information for the bridges in the geographical area.

In some examples, the method 1600 further comprises accessing information of a route for the vehicle, determining if a bridge in the route has a bridge height lower than the height of the vehicle, and generating a notification in response to determining that the bridge in the route has a bridge height lower than the height of the vehicle.

In some examples, the method 1600 further comprises generating a new route for the vehicle in response to determining that the bridge in the route has a bridge height lower than the height of the vehicle.

In some examples, the method 1600 further comprises sending, by the monitoring device to a server, a notification of the in-cab alert in response to the bridge height being less than the height of the vehicle.

Another general aspect is for a system that includes a memory comprising instructions and one or more computer processors. The instructions, when executed by the one or more computer processors, cause the one or more computer processors to perform operations comprising: accessing, by a monitoring device in a vehicle, a location of the vehicle; determining, by the monitoring device, a segment in a map corresponding to the location of the vehicle; accessing bridge information based on the segment, the bridge information comprising a number of segments to reach a bridge and a bridge height; determining if the bridge height is less than a height of the vehicle; and generating, by the monitoring device, an in-cab alert in response to the bridge height being less than the height of the vehicle.

In yet another general aspect, a tangible machine-readable storage medium (e.g., a non-transitory storage medium) includes instructions that, when executed by a machine, cause the machine to perform operations comprising: accessing, by a monitoring device in a vehicle, a location of the vehicle; determining, by the monitoring device, a segment in a map corresponding to the location of the vehicle; accessing bridge information based on the segment, the bridge information comprising a number of segments to reach a bridge and a bridge height; determining if the bridge height is less than a height of the vehicle; and generating, by the monitoring device, an in-cab alert in response to the bridge height being less than the height of the vehicle.

Figure 17:
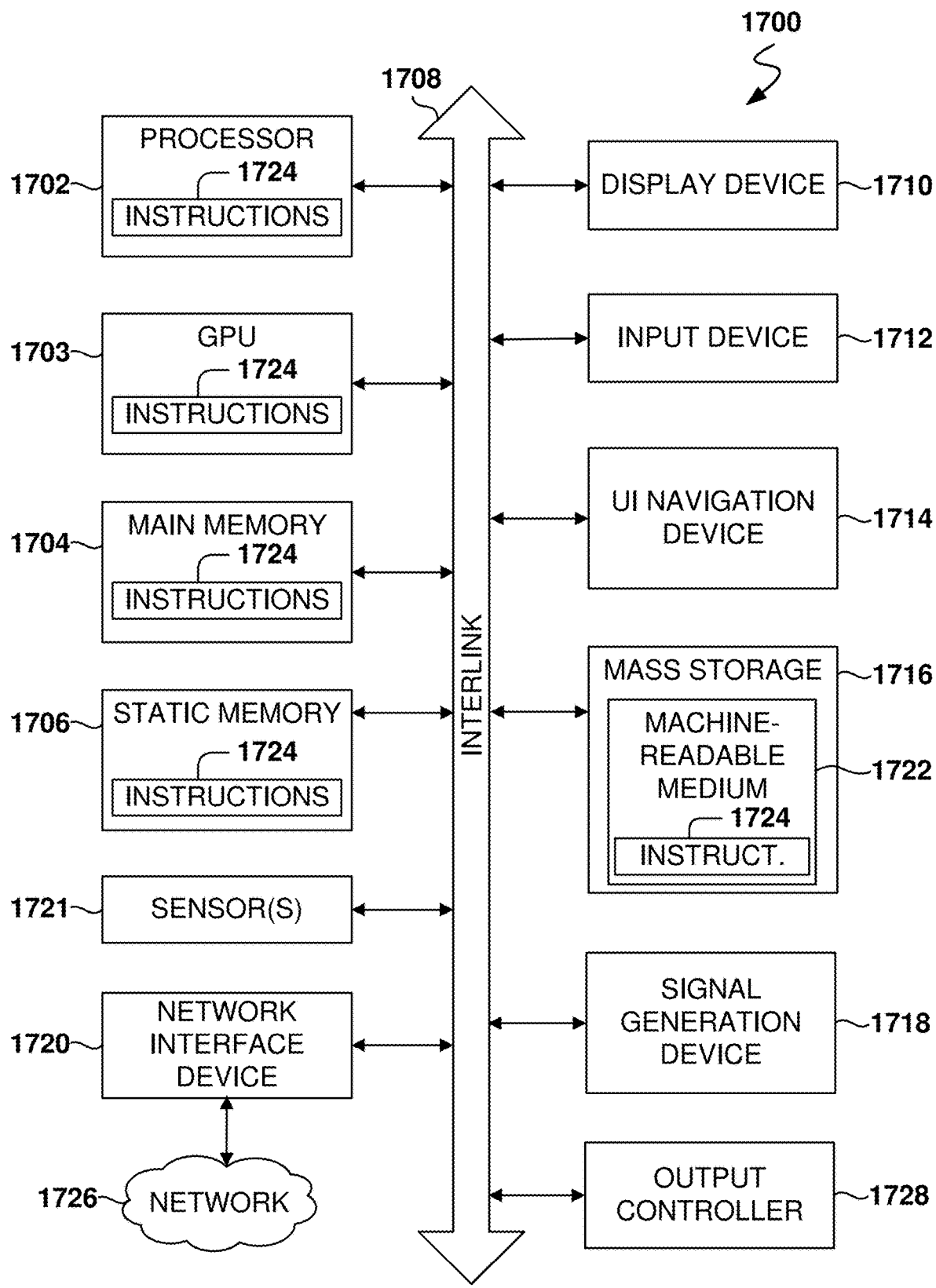
FIG. 17 is a block diagram illustrating an example of a machine upon or by which one or more example process examples described herein may be implemented or controlled.

FIG. 17 is a block diagram illustrating an example of a machine 1700 upon or by which one or more example process examples described herein may be implemented or controlled. In alternative examples, the machine 1700 may operate as a standalone device or be connected (e.g., networked) to other machines. In a networked deployment, the machine 1700 may operate in the capacity of a server machine, a client machine, or both in server-client network environments. In an example, the machine 1700 may act as a peer machine in a peer-to-peer (P2P) (or other distributed) network environment. Further, while only a single machine 1700 is illustrated, the term "machine" shall also be taken to include any collection of machines that individually or jointly execute a set (or multiple sets) of instructions to perform any one or more of the methodologies discussed herein, such as via cloud computing, software as a service (SaaS), or other computer cluster configurations.

Examples, as described herein, may include, or may operate by, logic, various components, or mechanisms. Circuitry is a collection of circuits implemented in tangible entities, including hardware (e.g., simple circuits, gates, logic). Circuitry membership may be flexible over time and underlying hardware variability. Circuitries include members that may, alone or in combination, perform specified operations when operating. In an example, the hardware of the circuitry may be immutably designed to carry out a specific operation (e.g., hardwired). In an example, the hardware of the circuitry may include variably connected physical components (e.g., execution units, transistors, simple circuits), including a computer-readable medium physically modified (e.g., magnetically, electrically, by moveable placement of invariant massed particles) to encode instructions of the specific operation. In connecting the physical components, the underlying electrical properties of a hardware constituent are changed (for example, from an insulator to a conductor or vice versa). The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other circuitry components when the device operates. In an example, any of the physical components may be used in more than one member of more than one circuitry. For example, under operation, execution units may be used in a first circuit of a first circuitry at one point in time and reused by a second circuit in the first circuitry or by a third circuit in a second circuitry at a different time.

The machine 1700 (e.g., computer system) may include a hardware processor 1702 (e.g., a central processing unit (CPU), a hardware processor core, or any combination thereof), a graphics processing unit (GPU 1703), a main memory 1704, and a static memory 1706, some or all of which may communicate with each other via an interlink 1708 (e.g., bus). The machine 1700 may further include a display device 1710, an alphanumeric input device 1712 (e.g., a keyboard), and a user interface (UI) navigation device 1714 (e.g., a mouse). In an example, the display device 1710, alphanumeric input device 1712, and UI navigation device 1714 may be a touch screen display. The machine 1700 may additionally include a mass storage device 1716 (e.g., drive unit), a signal generation device 1718 (e.g., a speaker), a network interface device 1720, and one or more sensors 1721, such as a Global Positioning System (GPS) sensor, compass, accelerometer, or another sensor. The machine 1700 may include an output controller 1728, such as a serial (e.g., universal serial bus (USB)), parallel, or other wired or wireless (e.g., infrared (IR), near field communication (NFC)) connection to communicate with or control one or more peripheral devices (e.g., a printer, card reader).

The processor 1702 refers to any one or more circuits or virtual circuits (e.g., a physical circuit emulated by logic executing on an actual processor) that manipulates data values according to control signals (e.g., commands, opcodes, machine code, control words, macroinstructions, etc.) and which produces corresponding output signals that are applied to operate a machine. A processor 1702 may, for example, include at least one of a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), a Tensor Processing Unit (TPU), a Neural Processing Unit (NPU), a Vision Processing Unit (VPU), a Machine Learning Accelerator, an Artificial Intelligence Accelerator, an Application Specific Integrated Circuit (ASIC), a Field Programmable Gate Array (FPGA), a Radio-Frequency Integrated Circuit (RFIC), a Neuromorphic Processor, a Quantum Processor, or any combination thereof.

The processor 1702 may further be a multi-core processor having two or more independent processors (sometimes referred to as "cores") that may execute instructions contemporaneously. Multi-core processors contain multiple computational cores on a single integrated circuit die, each of which can independently execute program instructions in parallel. Parallel processing on multi-core processors may be implemented via architectures like superscalar, VLIW, vector processing, or SIMD that allow each core to run separate instruction streams concurrently. The processor 1702 may be emulated in software, running on a physical processor, as a virtual processor or virtual circuit. The virtual processor may behave like an independent processor but is implemented in software rather than hardware.

The mass storage device 1716 may include a machine-readable medium 1722 on which one or more sets of data structures or instructions 1724 (e.g., software) embodying or utilized by any of the techniques or functions described herein. The instructions 1724 may also reside, completely or at least partially, within the main memory 1704, within the static memory 1706, within the hardware processor 1702, or the GPU 1703 during execution thereof by the machine 1700. For example, one or any combination of the hardware processor 1702, the GPU 1703, the main memory 1704, the static memory 1706, or the mass storage device 1716 may constitute machine-readable media.

While the machine-readable medium 1722 is illustrated as a single medium, the term "machine-readable medium" may include a single medium or multiple media (e.g., a centralized or distributed database and associated caches and servers) configured to store one or more instructions 1724.

The term "machine-readable medium" may include any medium that is capable of storing, encoding, or carrying instructions 1724 for execution by the machine 1700 and that causes the machine 1700 to perform any one or more of the techniques of the present disclosure or that is capable of storing, encoding, or carrying data structures used by or associated with such instructions 1724. Non-limiting machine-readable medium examples may include solid-state memories and optical and magnetic media. For example, a massed machine-readable medium comprises a machine-readable medium 1722 with a plurality of particles having invariant (e.g., rest) mass. Accordingly, massed machine-readable media are not transitory propagating signals. Specific examples of massed machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1724 may be transmitted or received over a communications network 1726 using a transmission medium via the network interface device 1720.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented separately. These and other variations, modifications, additions, and improvements fall within the scope of the subject matter herein.

The examples illustrated herein are described in sufficient detail to enable those skilled in the art to practice the teachings disclosed. Other examples may be used and derived therefrom, such that structural and logical substitutions and changes may be made without departing from the scope of this disclosure. The Detailed Description, therefore, is not to be taken in a limiting sense, and the scope of various examples is defined only by the appended claims, along with the full range of equivalents to which such claims are entitled.

Additionally, as used in this disclosure, phrases of the form "at least one of an A, a B, or a C," "at least one of A, B, and C," and the like should be interpreted to select at least one from the group that comprises "A, B, and C." Unless explicitly stated otherwise in connection with a particular instance, in this disclosure, this manner of phrasing does not mean "at least one of A, at least one of B, and at least one of C." As used in this disclosure, the example "at least one of an A, a B, or a C" would cover any of the following selections: {A}, {B}, {C}, {A, B}, {A, C}, {B, C}, and {A, B, C}.

Moreover, plural instances may be provided for resources, operations, or structures described herein as a single instance. Additionally, boundaries between various resources, operations, modules, engines, and data stores are somewhat arbitrary, and particular operations are illustrated in the context of specific illustrative configurations. Other allocations of functionality are envisioned and may fall within the scope of various examples of the present disclosure. In general, structures and functionality are presented as separate resources in the example; configurations may be implemented as a combined structure or resource. Similarly, structures and functionality presented as a single resource may be implemented as separate resources. These and other variations, modifications, additions, and improvements fall within a scope of examples of the present disclosure as represented by the appended claims. Accordingly, the specification and drawings are to be regarded in an illustrative rather than a restrictive sense.

What is claimed is:

1. A computer-implemented method comprising:
    receiving, by a monitoring device in a vehicle, the monitoring device comprising one or more computer processors and a memory, map data comprising a tree structure having a data tile for each node of the tree structure, each data tile corresponding to a section of the map, each data tile having a map zoom level from a plurality of map zoom levels, each data tile comprising information for one or more segments in the corresponding section of the map, wherein a segment is a portion of a road between two points in the road with a respective latitude and longitude;
    accessing, by the monitoring device, a location of the vehicle;
    determining, by the monitoring device, the segment of the map corresponding to the location of the vehicle based on the map data;

determining the data tile corresponding to the determined segment;
accessing a table stored in the data tile comprising information for the segments in the data tile, the information for each segment comprising bridge information, the bridge information for each segment comprising a number of segments to reach a bridge and a bridge height;
determining if the bridge height is less than a height of the vehicle; and
in response to the bridge height being less than the height of the vehicle, performing operations comprising:
generating, by the monitoring device, an in-cab alert;
generating, by the monitoring device, a new route for the vehicle; and
integrating, by the monitoring device, the new route into a turn-by-turn navigation system.

2. The method as recited in claim 1, wherein the table in the data tile further comprises fields for segment identifier (ID), bridge ID, bridge node ID where the bridge is located, and parent ID of node to reach the bridge.

3. The method as recited in claim 1, wherein the in-cab alert is generated when a distance to the bridge from the location of the vehicle is less than a predetermined threshold.

4. The method as recited in claim 1, wherein the tree structure is a quadtree tile structure comprising tiles at multiple zoom levels.

5. The method as recited in claim 1, further comprising:
generating, by a server, the bridge information for bridges in a geographical area, wherein generating the bridge information for each bridge comprises:
identifying bridge segment of the bridge;
identifying connected segments to the bridge segment; and
storing bridge segment information in the connected segments within a predetermined distance from the bridge.

6. The method as recited in claim 1, further comprising:
accessing information of a route for the vehicle;
determining if a bridge in the route has a bridge height lower than the height of the vehicle; and
generating a notification in response to determining that the bridge in the route has a bridge height lower than the height of the vehicle.

7. The method as recited in claim 1, further comprising:
sending, by the monitoring device to a server, a notification of the in-cab alert in response to the bridge height being less than the height of the vehicle.

8. A monitoring device comprising:
a memory comprising instructions; and
one or more computer processors, wherein the instructions, when executed by the one or more computer processors, cause the monitoring device to perform operations comprising:
receiving, by a monitoring device in a vehicle, map data comprising a tree structure having a data tile for each node of the tree structure, each data tile corresponding to a section of the map, each data tile having a map zoom level from a plurality of map zoom levels, each data tile comprising information for one or more segments in the corresponding section of the map, wherein a segment is a portion of a road between two points in the road with a respective latitude and longitude;
accessing, by the monitoring device, a location of the vehicle;
determining, by the monitoring device, the segment of the map corresponding to the location of the vehicle based on the map data;
determining the data tile corresponding to the determined segment;
accessing a table stored in the data tile comprising information for the segments in the data tile, the information for each segment comprising bridge information, the bridge information for each segment comprising a number of segments to reach a bridge and a bridge height;
determining if the bridge height is less than a height of the vehicle; and
in response to the bridge height being less than the height of the vehicle, performing operations comprising:
generating, by the monitoring device, an in-cab alert;
generating, by the monitoring device, a new route for the vehicle; and
integrating, by the monitoring device, the new route into a turn-by-turn navigation system.

9. The monitoring device as recited in claim 8, wherein the table in the data tile further comprises fields for segment identifier (ID), bridge ID, bridge node ID where the bridge is located, and parent ID of node to reach the bridge.

10. The monitoring device as recited in claim 8, wherein the in-cab alert is generated when a distance to the bridge from the location of the vehicle is less than a predetermined threshold.

11. The monitoring device as recited in claim 8, wherein the tree structure is a quadtree tile structure comprising tiles at multiple zoom levels.

12. A non-transitory machine-readable storage medium including instructions that, when executed by a machine, cause the machine to perform operations comprising:
receiving, by a monitoring device in a vehicle, the monitoring device comprising one or more computer processors and a memory, map data comprising a tree structure having a data tile for each node of the tree structure, each data tile corresponding to a section of the map, each data tile having a map zoom level from a plurality of map zoom levels, each data tile comprising information for one or more segments in the corresponding section of the map, wherein a segment is a portion of a road between two points in the road with a respective latitude and longitude;
accessing, by the monitoring device, a location of the vehicle;
determining, by the monitoring device, the segment of the map corresponding to the location of the vehicle based on the map data;
determining the data tile corresponding to the determined segment;
accessing a table stored in the data tile comprising information for the segments in the data tile, the information for each segment comprising bridge information, the bridge information for each segment comprising a number of segments to reach a bridge and a bridge height;
determining if the bridge height is less than a height of the vehicle; and
in response to the bridge height being less than the height of the vehicle, performing operations comprising:
generating, by the monitoring device, an in-cab alert;
generating, by the monitoring device, a new route for the vehicle; and integrating, by the monitoring device, the new route into a turn-by-turn navigation system.

13. The non-transitory machine-readable storage medium as recited in claim 12, wherein the table in the data tile further comprises fields for segment identifier (ID), bridge ID, bridge node ID where the bridge is located, and parent ID of node to reach the bridge.

14. The non-transitory machine-readable storage medium as recited in claim 12, wherein the in-cab alert is generated when a distance to the bridge from the location of the vehicle is less than a predetermined threshold.

15. The non-transitory machine-readable storage medium as recited in claim 12, wherein the tree structure is a quadtree tile structure comprising tiles at multiple zoom levels.

* * * * *